US011945231B2

(12) United States Patent
Asauchi

(10) Patent No.: US 11,945,231 B2
(45) Date of Patent: Apr. 2, 2024

(54) PRINTING MATERIAL CONTAINER, AND BOARD MOUNTED ON PRINTING MATERIAL CONTAINER

(71) Applicant: SEIKO EPSON CORPORATION, Tokyo (JP)

(72) Inventor: Noboru Asauchi, Nagano (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/138,979

(22) Filed: Apr. 25, 2023

(65) Prior Publication Data

US 2023/0330996 A1 Oct. 19, 2023

Related U.S. Application Data

(60) Continuation of application No. 17/670,177, filed on Feb. 11, 2022, now Pat. No. 11,667,126, which is a (Continued)

(30) Foreign Application Priority Data

Dec. 26, 2005 (JP) ................................ 2005-372028
Aug. 11, 2006 (JP) ................................ 2006-220751

(51) Int. Cl.
*B41J 2/175* (2006.01)
*B41J 2/14* (2006.01)

(52) U.S. Cl.
CPC ....... *B41J 2/17526* (2013.01); *B41J 2/17503* (2013.01); *B41J 2/1752* (2013.01); (Continued)

(58) Field of Classification Search
CPC .. B41J 2/1753; B41J 2/17566; B41J 2/17503; B41J 2/17526; B41J 2/17546; (Continued)

(56) References Cited

U.S. PATENT DOCUMENTS 4,683,481 A 7/1987 Johnson
4,739,352 A 4/1988 Gorelick et al.
(Continued)

FOREIGN PATENT DOCUMENTS

CA 2483860 C 3/2008
CN 1272081 A 11/2000
(Continued)

OTHER PUBLICATIONS

Jul. 16, 2020 Notice of Allowance issued in U.S. Appl. No. 16/824,546.
(Continued)

*Primary Examiner* — An H Do
(74) *Attorney, Agent, or Firm* — Oliff PLC

(57) ABSTRACT

A printing material container is detachably attachable to a printing apparatus having a plurality of apparatus-side terminals. The printing material container comprises a first device, a second device, and a terminal group that includes a plurality of first terminals, at least one second terminal and at least one third terminal. The plurality of first terminals are connected to the first device and respectively include a first contact portion for contacting a corresponding terminal among the plurality of apparatus-side terminals. The at least one second terminal is connected to the second device and includes a second contact portion for contacting a corresponding terminal among the plurality of apparatus-side terminals. The at least one third terminal is for the detection of shorting between the at least one second terminal and the at least one third terminal and includes a third contact portion for contacting a corresponding terminal among the plurality of apparatus-side terminals. The at least one second contact portion, the plurality of the first contact portions, and the at least one third contact portion are arranged so as to form one or multiple rows. The at least one second contact portion is arranged at an end of one row among the one or multiple rows.

5 Claims, 22 Drawing Sheets

Related U.S. Application Data continuation of application No. 17/036,780, filed on Sep. 29, 2020, now Pat. No. 11,279,138, which is a continuation of application No. 16/824,546, filed on Mar. 19, 2020, now Pat. No. 10,836,173, which is a continuation of application No. 16/289,094, filed on Feb. 28, 2019, now Pat. No. 10,625,510, which is a continuation of application No. 15/332,070, filed on Oct. 24, 2016, now Pat. No. 10,259,230, which is a continuation of application No. 15/171,793, filed on Jun. 2, 2016, now Pat. No. 9,505,226, which is a division of application No. 14/922,889, filed on Oct. 26, 2015, now Pat. No. 9,381,750, which is a continuation of application No. 14/518,618, filed on Oct. 20, 2014, now Pat. No. 9,180,675, which is a continuation of application No. 14/332,973, filed on Jul. 16, 2014, now Pat. No. 8,882,513, which is a continuation of application No. 14/194,120, filed on Feb. 28, 2014, now Pat. No. 8,801,163, which is a continuation of application No. 13/902,171, filed on May 24, 2013, now Pat. No. 8,794,749, which is a continuation of application No. 13/608,658, filed on Sep. 10, 2012, now Pat. No. 8,454,116, which is a continuation of application No. 12/257,914, filed on Oct. 24, 2008, now Pat. No. 8,366,233, which is a continuation of application No. 12/040,308, filed on Feb. 29, 2008, now Pat. No. 7,484,825, which is a continuation of application No. 11/611,641, filed on Dec. 15, 2006, now Pat. No. 7,562,958.

(52) U.S. Cl.
CPC ......... *B41J 2/1753* (2013.01); *B41J 2/17546* (2013.01); *B41J 2/17566* (2013.01); *B41J 2002/14491* (2013.01); *B41J 2002/17579* (2013.01); *Y10S 439/9241* (2013.01)

(58) Field of Classification Search
CPC ............ B41J 2/1752; B41J 2002/17579; B41J 2002/14491; Y10S 439/9241
See application file for complete search history.

(56) References Cited

U.S. PATENT DOCUMENTS

| | | | |
|---|---|---|---|
| 5,032,855 | A | 7/1991 | Taniguchi et al. |
| 5,049,898 | A | 9/1991 | Arthur et al. |
| 5,278,584 | A | 1/1994 | Keefe et al. |
| 5,565,786 | A | 10/1996 | Balousek |
| 5,610,635 | A | 3/1997 | Murray et al. |
| 5,646,660 | A | 7/1997 | Murray |
| 5,699,091 | A | 12/1997 | Bullock et al. |
| 5,710,582 | A | 1/1998 | Hawkins et al. |
| 5,751,311 | A | 5/1998 | Drake |
| 5,788,388 | A | 8/1998 | Cowger et al. |
| 5,940,095 | A | 8/1999 | Parish et al. |
| 5,988,783 | A | 11/1999 | Tajika et al. |
| 6,000,773 | A | 12/1999 | Murray et al. |
| 6,039,428 | A | 3/2000 | Juve |
| 6,065,824 | A | 5/2000 | Bullock et al. |
| 6,074,042 | A | 6/2000 | Gasvoda et al. |
| 6,086,193 | A | 7/2000 | Shimada et al. |
| 6,130,695 | A | 10/2000 | Childers et al. |
| 6,155,664 | A | 12/2000 | Cook |
| 6,155,678 | A | 12/2000 | Komplin et al. |
| 6,161,915 | A | 12/2000 | Bolash et al. |
| 6,164,743 | A | 12/2000 | Hmelar et al. |
| 6,168,262 | B1 | 1/2001 | Clark et al. |
| 6,183,056 | B1 | 2/2001 | Corrigan et al. |
| 6,260,942 | B1 | 7/2001 | Ahne et al. |
| 6,280,017 | B1 | 8/2001 | Miyauchi |
| 6,290,333 | B1 | 9/2001 | Wade et al. |
| 6,318,828 | B1 | 11/2001 | Barbour et al. |
| 6,332,677 | B1 | 12/2001 | Steinfield et al. |
| 6,431,670 | B1 | 8/2002 | Schantz et al. |
| 6,431,678 | B2 | 8/2002 | Beck et al. |
| 6,435,668 | B1 | 8/2002 | Barbour et al. |
| 6,502,917 | B1 | 1/2003 | Shinada et al. |
| 6,536,871 | B1 | 3/2003 | Haddick et al. |
| 6,550,902 | B2 | 4/2003 | Shinada et al. |
| 6,554,382 | B1 | 4/2003 | Sleger |
| 6,585,359 | B1 | 7/2003 | Gasvoda et al. |
| 6,631,967 | B1 | 10/2003 | Saruta |
| 6,648,434 | B2 | 11/2003 | Walker et al. |
| 6,648,445 | B2 | 11/2003 | Ishizawa et al. |
| 6,658,880 | B1 | 12/2003 | Bruzzo |
| 6,705,694 | B1 | 3/2004 | Barbour et al. |
| 6,719,397 | B1 | 4/2004 | Hu et al. |
| 6,745,626 | B2 | 6/2004 | Usui et al. |
| 6,749,287 | B2 | 6/2004 | Osada et al. |
| 6,834,945 | B2 | 12/2004 | Ishizawa et al. |
| 7,008,053 | B2 | 3/2006 | Hashii et al. |
| 7,032,994 | B2 | 4/2006 | O'Hara et al. |
| 7,059,696 | B2 | 6/2006 | Eguchi et al. |
| 7,101,029 | B2 | 9/2006 | Kawamura et al. |
| 7,125,100 | B2 | 10/2006 | Ishizawa et al. |
| 7,137,690 | B2 | 11/2006 | Kawamura et al. |
| 7,175,244 | B2 | 2/2007 | Usui et al. |
| 7,201,463 | B2 | 4/2007 | Kosugi et al. |
| 7,219,985 | B2 | 5/2007 | Shinada et al. |
| 7,237,864 | B2 | 7/2007 | Sarmast et al. |
| 7,290,848 | B2 | 11/2007 | Masuda |
| 7,306,308 | B2 | 12/2007 | Tsukada et al. |
| 7,311,374 | B2 | 12/2007 | Oomura |
| 7,354,144 | B2 | 4/2008 | Hatasa et al. |
| 7,510,251 | B2 | 3/2009 | Wanibe et al. |
| 7,552,999 | B2 | 6/2009 | Wanibe et al. |
| 7,556,363 | B2 | 7/2009 | Yamamoto |
| 7,562,958 | B2 | 7/2009 | Asauchi |
| 7,591,538 | B2 | 9/2009 | Toge et al. |
| 7,967,415 | B2 | 6/2011 | Asauchi et al. |
| 8,690,280 | B2 | 4/2014 | Nakano et al. |
| 8,794,749 | B2 | 8/2014 | Asauchi |
| 8,807,720 | B2 | 8/2014 | Fujisawa et al. |
| 9,434,173 | B2 | 9/2016 | Kubota et al. |
| 2002/0003551 | A1 | 1/2002 | Beck et al. |
| 2002/0024559 | A1 | 2/2002 | Murray et al. |
| 2002/0135623 | A1 | 9/2002 | Tsukada et al. |
| 2002/0167574 | A1 | 11/2002 | Shinada et al. |
| 2002/0171700 | A1 | 11/2002 | Shinada et al. |
| 2002/0180823 | A1 | 12/2002 | Shinada et al. |
| 2003/0043216 | A1 | 3/2003 | Usui et al. |
| 2003/0054003 | A1 | 3/2003 | Leung et al. |
| 2003/0058296 | A1 | 3/2003 | Shinada et al. |
| 2003/0071862 | A1 | 4/2003 | Tsukada et al. |
| 2003/0079655 | A1 | 5/2003 | Takahashi et al. |
| 2003/0085969 | A1 | 5/2003 | Shinada et al. |
| 2003/0137568 | A1 | 7/2003 | Shinada et al. |
| 2004/0135857 | A1 | 7/2004 | Hashii et al. |
| 2004/0155913 | A1 | 8/2004 | Kosugi et al. |
| 2004/0183848 | A1 | 9/2004 | Hasseler |
| 2005/0057622 | A1 | 3/2005 | Kimura et al. |
| 2005/0146576 | A1 | 7/2005 | Shinada et al. |
| 2005/0146579 | A1 | 7/2005 | Sasaki et al. |
| 2005/0146580 | A1 | 7/2005 | Hashii et al. |
| 2005/0195255 | A1 | 9/2005 | Shinada et al. |
| 2005/0200670 | A1 | 9/2005 | Hashii et al. |
| 2005/0219303 | A1 | 10/2005 | Matsumoto et al. |
| 2005/0237349 | A1 | 10/2005 | Nishihara |
| 2005/0270315 | A1 | 12/2005 | Yamamoto |
| 2006/0007253 | A1 | 1/2006 | Kosugi |
| 2006/0033790 | A1 | 2/2006 | Shinada et al. |
| 2006/0119677 | A1 | 6/2006 | Shinada et al. |
| 2006/0152564 | A1 | 7/2006 | Hashii et al. |
| 2006/0203050 | A1 | 9/2006 | Shinada et al. |
| 2006/0250426 | A1 | 11/2006 | Wanibe et al. |
| 2006/0250446 | A1 | 11/2006 | Wanibe et al. |
| 2007/0103515 | A1 | 5/2007 | Hashii et al. |
| 2007/0103522 | A1 | 5/2007 | Hashii et al. |
| 2007/0126770 | A1 | 6/2007 | Asauchi |

(56) References Cited

U.S. PATENT DOCUMENTS

| | | | |
|---|---|---|---|
| 2007/0149044 A1 | 6/2007 | Asauchi | |
| 2008/0158318 A1 | 7/2008 | Asauchi | |
| 2008/0259135 A1 | 10/2008 | Asauchi et al. | |
| 2009/0066768 A1 | 3/2009 | Hashii et al. | |
| 2010/0289847 A1 | 11/2010 | Ishizawa et al. | |

FOREIGN PATENT DOCUMENTS

| | | | |
|---|---|---|---|
| CN | 1481999 | A | 3/2004 |
| CN | 1532064 | A | 9/2004 |
| DE | 102006060705 | A1 | 6/2007 |
| EP | 0412459 | A2 | 2/1991 |
| EP | 0593282 | A2 | 4/1994 |
| EP | 0789322 | A2 | 8/1997 |
| EP | 0805028 | A2 | 11/1997 |
| EP | 08/12693 | A1 | 12/1997 |
| EP | 0873873 | A2 | 10/1998 |
| EP | 0882595 | A2 | 12/1998 |
| EP | 0 997 297 | A1 | 5/2000 |
| EP | 1013426 | A2 | 6/2000 |
| EP | 1053877 | A1 | 11/2000 |
| EP | 1155864 | A1 | 11/2001 |
| EP | 1156490 | A1 | 11/2001 |
| EP | 1170132 | A2 | 1/2002 |
| EP | 1188567 | A2 | 3/2002 |
| EP | 1219437 | A2 | 7/2002 |
| EP | 1254776 | A2 | 11/2002 |
| EP | 1279503 | A2 | 1/2003 |
| EP | 1281523 | A2 | 2/2003 |
| EP | 1300245 | A1 | 4/2003 |
| EP | 1310372 | A2 | 5/2003 |
| EP | 1314565 | A2 | 5/2003 |
| EP | 0 805 028 | B1 | 7/2003 |
| EP | 1389531 | A1 | 2/2004 |
| EP | 1424202 | A1 | 6/2004 |
| EP | 1462262 | A1 | 9/2004 |
| EP | 1514690 | A1 | 3/2005 |
| EP | 1097043 | B1 | 11/2005 |
| EP | 1598198 | A2 | 11/2005 |
| EP | 1792733 | A1 | 6/2007 |
| EP | 1800872 | A1 | 6/2007 |
| EP | 2080622 | B1 | 2/2011 |
| GB | 2369801 | A | 6/2002 |
| GB | 2424623 | A | 10/2006 |
| GB | 2446311 | A | 8/2008 |
| GB | 2447150 | A | 9/2008 |
| JP | S62-184856 | A | 8/1987 |
| JP | H02-009645 | A | 1/1990 |
| JP | H02-279344 | A | 11/1990 |
| JP | H03-211060 | A | 9/1991 |
| JP | H05-246032 | A | 9/1993 |
| JP | H06-320818 | A | 11/1994 |
| JP | H07-052411 | A | 2/1995 |
| JP | H07-060954 | A | 3/1995 |
| JP | H07-309018 | A | 11/1995 |
| JP | H08-090871 | A | 4/1996 |
| JP | H08-221158 | A | 8/1996 |
| JP | H09-174827 | A | 7/1997 |
| JP | H10-006535 | A | 1/1998 |
| JP | H10-086357 | A | 4/1998 |
| JP | H11-312554 | A | 11/1999 |
| JP | H11-320857 | A | 11/1999 |
| JP | 2000-006413 | A | 1/2000 |
| JP | 2000-198190 | A | 7/2000 |
| JP | 2001-147146 | A | 5/2001 |
| JP | 2002-079655 | A | 3/2002 |
| JP | 2002-154222 | A | 5/2002 |
| JP | 2002-513340 | A | 5/2002 |
| JP | 2002-198627 | A | 7/2002 |
| JP | 2003-054003 | A | 2/2003 |
| JP | 2003-103796 | A | 4/2003 |
| JP | 2003-152297 | A | 5/2003 |
| JP | 2004-050573 | A | 2/2004 |
| JP | 2004-261970 | A | 9/2004 |
| JP | 2004-310312 | A | 11/2004 |
| JP | 2005-022345 | A | 1/2005 |
| JP | 2005-161764 | A | 6/2005 |
| JP | 2005-246664 | A | 9/2005 |
| JP | 2005-343037 | A | 12/2005 |
| JP | 2005-372028 | | 12/2005 |
| JP | 2006-100398 | A | 4/2006 |
| JP | 2006-326935 | A | 12/2006 |
| JP | 2007160589 | A | 6/2007 |
| JP | 2007-196664 | A | 8/2007 |
| TW | 310363 | B | 7/1997 |
| TW | 200520981 | A | 7/2005 |
| TW | 200526423 | A | 8/2005 |
| WO | 98/04414 | A1 | 2/1998 |
| WO | 98/55318 | A1 | 12/1998 |
| WO | 98/55324 | A1 | 12/1998 |
| WO | 02/04214 | A1 | 1/2002 |
| WO | 02/04215 | A1 | 1/2002 |
| WO | 2005/000591 | A1 | 1/2005 |
| WO | 2006/025575 | A1 | 3/2006 |
| WO | 2006/025578 | A1 | 3/2006 |
| WO | 2006/104258 | A1 | 10/2006 |

OTHER PUBLICATIONS

XI. Counterclaim for Patent Nullity delivered to the Applicant's Attorney in patent infringement procedure for Argentine Patent No. AR058636 in Spanish with English translation.
Wish to Supplement Counterclaim delivered to the Applicant's Attorney in patent infringement procedure for Argentine Patent No. AR058636 in Spanish with English translation.
XI. Counterclaim for Patent Nullity delivered to the Applicant's Attorney on Jun. 20, 2015 in patent infringement procedure for Argentine Patent No. AR058636.
Wish to Supplement Counterclaim delivered to the Applicant's Attorney on Jun. 20, 2015 in patent infringement procedure for Argentine Patent No. AR058636.
Pelican Brief dated May 8, 2015 and English translation.
Pelican Submission dated Jun. 4, 2015 and English translation.
Affidavit of Daniel Sulser dated Jun. 3, 2015 and its Annexes.
Notice of Opposition to European Patent No. 2277707 dated Mar. 25, 2015 and English translation.
HP 2000C Printer User Handbook dated Feb. 28, 2002.
Opposition Brief and partial English translation for an Opposition for German Patent No. DE102006060705 dated Feb. 16, 2015.
International Search Report for International Patent Application No. PCT/JP20051016205 dated Nov. 22, 2005.
English translation of Written Opinion of the International Searching Authority issued in International Patent Application No. PCT/JP2005/016205 dated Mar. 29, 2007.
Search Report from U.K. Patent Application No. GB0804416.6 dated May 30, 2013.
Defendant's third preparatory pleadings to Tokyo District Court. Civil Affairs Div. 29-C in connection with 2010 (wa) No. 7482 Patent Infringement Injunction dated Sep. 30, 2010.
Defendant's second preparatory pleadings to Tokyo District Court, Civil Affairs Div. 29-C in connection with 2010 (wa) No. 7482 Patent Infringement Injunction dated Sep. 30, 2010.
Defendant's Demand for Judgment to Tokyo District Court, Civil Affairs Div. 29-C in connection with 2010 (wa) No. 7482 Patent Infringement Injunction dated Sep. 29, 2010.
Written Submission by Pelican Hardcopy Production AG in Opposition Proceedings of EPI800872, dated Aug. 31, 2011.
English translation of Written Submission by Pelican Hardcopy Production AG in Opposition Proceedings of EPI800872, dated Aug. 31, 2011.
Interlocutory decision in opposition proceedings for EP-B-1800872 dated Nov. 29, 2011.
Search Report for U.K. Patent Application No. GB0625839.6 dated Apr. 20, 2007.
Affidavit of Joachim Kretschmer regarding analysis of "T071x" Epson ink cartrige and "Epson Stylus 078" dated Apr. 10, 2012 and English translation.
Photo of Epson cartridge dated Apr. 10, 2012.

(56) References Cited

OTHER PUBLICATIONS

Notice of Experiments dated Apr. 17, 2013 including Annex 1 and Annex 2 to Schedule A.
Statement of grounds for appeal for EP 1800872 B1 dated Apr. 10, 2012 and English translation.
English translation of Response to Appeal dated Oct. 1, 2012 for European Patent No. 1800872 B1.
U.S. Appl. No. 11/572,880, filed Jun. 25, 2008.
Article on Epson Stylus D78 and D88 plus dated Aug. 21, 2006 and English translation.
Article on Epson Stylus D120 dated Dec. 14, 2007 and English translation.
Search and Examination Report issued in counterpart application GB0922617.6 by the Intellectual Property Office of the United Kingdom dated Mar. 12, 2010.
U.S. Appl. No. 12/257,827, filed Oct. 24, 2008.
Response to Appeal dated Oct. 1, 2012 for European Patent No. 1800872 B1.
Photos of HP No. 10 cartridge listed on an EPO Opposition filing dated Nov. 23, 2011.
The Hard Copy Supplies Journal dated Apr. 1998.
HP2000C User Guide listed on an EPO Opposition filing dated Nov. 23, 2011.
"Dallas Semiconductor, DSI220AB/AD, 16K Nonvolatile SRAM", cited in Japanese Patent Document No. 4144637 apparently dated Feb. 19, 1998 and listed on an EPO Opposition filing dated Nov. 23, 2011.
Notice of Opposition for EP2080622 dated Dec. 7, 2011.
Opposition Form for EP2080622 filed Nov. 28, 2011.
Grounds of Opposition for EP2080622 dated Nov. 23, 2011 and English translation.
Decision of Appeal for Invalidation 2011-800028 and English translation.
HL4a-d. Claims 1, 10, 11 and 12—EP2080622BA received at the EPO on Nov. 23, 2011.
Office Action dated Oct. 23, 2012 in Taiwan Patent Application No. 099126391 and its English translation.
U.S. Appl. No. 12/257,827.
Expert Report of Professor Joachim Heinzl dated May 1, 2013.
Notice of Opposition filed against EP1800872B1, Annexes of the Notice of Opposition, and an English translation thereof dated Apr. 26, 2010.
Accelerated Graphic Port Interface Specification dated Jul. 31, 1996, pp. 89-96.
English Translation of Taiwanese Search Report dated Apr. 22, 2010 in a related Taiwanese application.
International Search Report and Written Opinion for International Patent Application No. PCT/JP2006/325448 dated May 8, 2007.
"Written Statement", in Japanese Patent Document No. 4144637, (original Japanese and English), dated Aug. 26, 2011.
"Rebuttal to Corrected Claims", in Japanese Patent Document No. 4144637, Trial Examiner-In-Chief, Patent Office Trial Examiner, (original Japanese and English), dated Jul. 11, 2011.
Rebuttal to the Reply Brief, in Japanese Patent Document No. 4144637, Trial Examiner-In-Chief, Patent Office Trial Examiner, (original Japanese and English), dated Jul. 11, 2011.
Opinion Brief, in Japanese Patent Document No. 4144637, Trial Examiner-In-Chief, Patent Office Trial Examiner, (original Japanese and English), dated Jul. 11, 2011.
"Notice of Examination", in Japanese Patent Document No. 4144637, Notification Examiner-In-Chief, Patent Office, (original Japanese and English), dated Aug. 22, 2011.
"Notice of Reasons for Rejection (of Amendments)", in Japanese Patent Document No. 4144637, (original Japanese and English), dated Aug. 26, 2011.
Statement of Defense and Counterclaim dated Dec. 29, 2010 in Dutch Case No. 378291 re EP1800872B and English translation.
Defendant's Brief dated Dec. 17, 2010 in Japanese Patent Rights Infringement Demand for Injury Case 2010 (Wa) No. 7482 (3-20101217) and English translation.
Response to Complaint dated Sep. 17, 2010 in German Action re EP1800872B and English translation.
"Response to Complaint dated Sep. 17, 2010 in German Action re Utility Model DE 20 2006 020730 U1 and English translation."
U.S. Appl. No. 12/257,914.
Defendant's Deed of Appearance and Reply (Italian language version)—Patent infringement litigation based on two counterpart patents EP1800872B1 and IT13742753 dated Feb. 9, 2011.
Defendant's Deed of Appearance and Reply (English language version)—Patent infringement litigation based on two counterpart patents EP1800872B1 and IT1374275 dated Feb. 9, 2011.
Defendant's Second Preparatory Brief dated Feb. 16, 2011; 2010 (Wa) No. 7482 Patent Rights Infringement Demand for Injunction Case for JP4144637B.
International Preliminary Report on Patentability and Written Opinion dated Jul. 1, 2008 in PCT/JP2006/325448.
Spanish Patent Application No. P200603218 Search Report and Written Opinion dated Sep. 21, 2009.
Malaysian Patent Application No. P120091706 Office Action dated Dec. 31, 2010.
European Patent Application EP10184458.7 Search Report dated Dec. 27, 2010.
Summons to Oral Proceeding and Notification in JP4144637B dated Feb. 22, 2011 and English translation.
Affidavit of Daniel Sulser regarding analysis of "T0714" Epson ink cartrige and "Epson Stylus 078" and photos from Sep. 2006 and English translation.
Opponent's Comments to the Patent Proprietor's Rejoinder in the Opposition Proceedings of EP1800872BI dated Jan. 27, 2011.
Notification of Reason for Rejection of Correction From Proceedings regarding JP Patent No. 4144637, dated Mar. 1, 2011.
Combined Search and Examination Report, U.K. Patent Application No. GB0819699.0 dated Feb. 27, 2009.
Petition to Tokyo District Court, Civil Affairs Div. 29-C in connection with "2010 (wa) No. 7482 Patent Infringement Injunction" dated Feb. 26, 2010, and the English translation thereof.
Defendant's first preparatory pleadings to Tokyo District Court, Civil Affairs Div. 29-C in connection with 2010 (wa) No. 7482 Patent Infringement Injunction dated Jun. 7, 2010 and the English translation thereof.
Australian Search and Examination Report dated May 8, 2007 and letter from Singapore Patent Office forwarding same dated Jun. 4, 2007.
U.S. Appl. No. 11/572,880.
Examination Report for New Zealand Patent Application No. 552094 dated Dec. 19, 2006.
Extended European Search Report for European Patent Application No. 06256540.3 dated May 4, 2007.
Canon Colour Bubble Jet Printer BJC-7000 User Manual dated 1997 and English translation.
Grounds for Appeal for EP2080622 dated Nov. 10, 2015 and English translation.
"A world of possibilities", HP Product Information, filed Jun. 6, 2016 as exhibit in Opposition Proceeding of European Patent No. 2295251 (4 pgs.).
"Dallas Semiconductor DS1220AB/AD, 16K Nonvolatile SRAM" cited in Japanese Patent Document No. 4144637 apparently dated Feb. 19, 1998 and listed on an EPO Opposition filing dated Nov. 23, 2011.
"EPSON Stylus Pro 1 0600 Delivers Quality Printing up to 44-Inches Wide," 2002, 3 pages.
"The 12C-Bus Specification," Version 2.1, Jan. 2000, 46 pages.
Axelson, J. "Using Serial EEPROMs", 1999, 27 pgs.
JP2007-160589A with English-language abstract, filed Jun. 6, 2016 as exhibit in Opposition Proceeding of European Patent No. 2295251 (16 pgs.).
Decision in the Appeal of German Appl. No. 1 02006 062 860 issued Nov. 29, 2017 with English-language translation (38 pgs.).
Decision of Opposition dated May 30, 2017 in German Patent No. 1 02006 060 705.8 with partial English-language translation (23 pgs.).
Decision of Technical Board of Appeal dated Sep. 27, 2013 in Opposition to EP 1800872 (43 pgs.).

(56) References Cited

OTHER PUBLICATIONS

Decision on Opposition dated Jun. 2, 2017 in Opposition to EP 2277707 B1 with attached Oral Hearing Minutes and Amendments to Patent (92 pgs.).
EEPROM Memory Programming Specification, Product PIC16F87X, Microchip Technology, Inc., 2002, 22 pgs.
English-language translation of JP2007-160589A, filed Jun. 6, 2016 as exhibit in Opposition Proceeding of European Patent No. 2295251 (41 pgs.).
English-language translation of Judgement dated May 16, 2013 issued by Dusseldorf Higher Regional Court in European Patent No. 2789466 (28 pgs.).
English-language translation of Priority Application No. JP 2006-220751, filed May 21, 2014 as exhibit in Opposition Proceeding of European Patent No. 2295251 (140 pgs.).
EPROM Memory Programming Specification, Product PIC12C5XX, Microchip Technology, Inc., 1998, 16 pgs.
EPROM Memory Programming Specification, Product PIC17C7XX, Microchip Technology, Inc., 1998, 28 pgs.
EPSON Stylus Pro 10600 Quick Reference Guide.
EPSON Stylus Pro 10600 Reference Guide, 312 pages.
EPSON Stylus Product Information Guide, 16 pages.
Examination Report dated Jul. 18, 2018 in related Australian Appl. 2017203181 (3 pgs.).
Extract of EP Patent No. 1863643, filed Jun. 6, 2016 as exhibit in Opposition Proceeding of European Patent No. 2295251 (2 pgs.).
Grounds for Appeal dated Aug. 18, 2017 in opposition to German Patent No. 1 02006 060705 with English-language translation (37 pgs.).
Grounds for Appeal in German Appl. No.1 02006 062 972 dated Oct. 24, 2017 with English language translation (39 pgs.).
Grounds for Opposition in European Patent No. 2789466 filed Jun. 6, 2017 with English-language translation (89 pgs.).
Grounds for Opposition in European Patent No. 2789466 filed Jun. 7, 2017 with English-language translation (44 pgs.).
Hochet et al., "Integrated Circuit Design," Power and Timing Modeling, Optimization and Simulation: 12th International Workshop, PATMOS, 2002, 1 page.
Invoice for sale of HP2000C Printer dated Jul. 31, 1999, filed Jun. 6, 2016 as exhibit in Opposition Proceeding of European Patent No. 2295251 (1 pg.).
Japanese-language Priority Application No. JP 2006-220751, filed May 21, 2014 as exhibit in Opposition Proceeding of European Patent No. 2295251 (67 pgs.).
Jones, David, "PCB Design Tutorial," Revision A, 2004, (25 pages).
Minutes of Oral Proceedings held Dec. 12, 2017 in German Appl. No. 10 2006 062 895 with English-language translation (5 pgs.).
Minutes of Oral Proceedings held Nov. 29, 2017 in German Appl. No. 10 2006 062 860 with English-language translation (7 pgs.).
Notice of Allowance on U.S. Appl. No. 15/332,070 dated Jul. 16, 2018.
Notice of Allowance on U.S. Appl. No. 15/332,070 dated Nov. 13, 2018.
Nullity Action dated May 8, 2017 in German File No. 602006 007 793.9 (Validation of EP1800872B) with partial English-language translation (70 pgs.).
Observations on Opposition to European Patent No. 1800872 dated Sep. 5, 2011 (15 pgs.).
Office Action dated Apr. 18, 2017 in related Japanese Appl. No. 2016-126141 (12 pgs.).
Office Action dated Aug. 1, 2018 in related Brazilian Appl. P10622253-6 with English-language translation (10 pgs.).
Office Action dated Feb. 6, 2018 in related Japanese Appl. No. 2017-119203 (4 pgs.).
Office Action dated Jul. 23, 2018 in related Brazilian Appl. P10620599-2 with English-language translation (12 pgs.).
Office Action dated Jul. 26, 2018 in related Brazilian Appl. P10622252-8 with English-language translation (13 pgs.).
Office Action dated Sep. 12, 2018 in related European Appl. 16182416.4 (4 pgs.).
Opponent's Comments to the Patent proprietor's Rejoinder in the Opposition Proceedings of EP1800872B1 dated Jan. 27, 2011.
Opponent's Written Submission dated Feb. 17, 2017 filed against European Patent No. 2277707 (Formerly European Patent Appln No. 10184458.7) and its English translation.
Photos of Epson cartridge dated Apr. 10, 2012.
Product Description, NM93C06 256-Bit Serial CMOS EEPROM (Microwire (TM) Synchronous Bus), Fairchild Semiconductor, Feb. 2000, 13 pgs.
Search and Examination Report dated Jul. 3, 2017 in related United Arab Emirates Application No. UAE/P/0630/2008 (11 pgs.).
Search Report dated Jan. 4, 2018 in related Norwegian Appl. 20141045 (2 pgs.).
Search Report for U.K. Patent Application GB0625839.6 dated Apr. 20, 2007.
Sketch related to a black HP Printhead, filed May 21, 2014 as exhibit in Opposition Proceeding of European Patent No. 2295251 (2 pgs.).
Specification of Epson Stylus 1500 printer dated Jan. 1996.
Summons to Attend Oral Proceedings and Provisional Non-Binding Opinion of the Opposition Division mailed Jan. 18, 2018 in related European Appl. 10184551.9 (12 pgs.).
Summons to attend oral proceedings pursuant to rule 115(1) EPC issued on Aug. 3, 2016 in European Patent Application No. 10184458.7.
Supplementation Brief filed Jan. 2, 2018 in Opposition Proceeding to German Patent No. 60 2006 007793.9 with English-language translation (7 pgs.).
Tarzwell et al., "High Voltage Printed Circuit Design & Manufacturing Notebook," Sierra Proto Express, 2004, 36 pages.
U.S. Notice of Allowance on U.S. Appl. No. 15/332,070 dated Mar. 19, 2018.
U.S. Notice of Allowance on U.S. Appl. No. 15/332,070 dated Dec. 7, 2017.
U.S. Office Action on 112898-0205 dated May 16, 2017.
Writ of Summons filed Sep. 19, 2017 in Swedish validation of European Patent No. 1800872 with English-language translation (76 pgs.).
Allowed claims corresponding to Application No. 2002-167574.
Allowed claims corresponding to Application No. 2002-171700.
Allowed claims corresponding to Application No. 2002-180823.
Allowed claims corresponding to Application No. 2003-58296.
Allowed claims corresponding to Application No. 2006-33790.
Allowed claims corresponding to Application No. 2006-119677.
Allowed claims of U.S. Appl. No. 11/611,641 (published as US-2007/149944-A1) filed Dec. 15, 2006.
Allowed claims of U.S. Appl. No. 12/040,308 (published as US-2008/158318-A1) filed Feb. 29, 2008.
English translation of Summons to Oral Proceeding and Notification in JP4144637B dated Feb. 22, 2011.
Dec. 7, 2010 Office Action in U.S. Appl. No. 11/572,880.
European Patent Office—Extended European Search Report Pursuant to Rule 62 EPC—dated Mar. 8, 2010.
Search Report from British patent appln. No. GB0804416.6 (dated May 30, 2008).
"Electrically Erasable Programmable Read-Only Memory (EEPROM)", retrieved Oct. 24, 2017 from de.wikipedia.org with English-language equivalent page (10 pgs.).
Jul. 22, 2021 Notice of Allowance issued in U.S. Appl. No. 17/036,780.
Nov. 12, 2021 Notice of Allowance Issued in U.S. Appl. No. 17/036,780.

A-A CROSS SECTION

B-B CROSS SECTION

C-C CROSS SECTION

D-D CROSS SECTION

E-E CROSS SECTION

F-F CROSS SECTION

PRINTING MATERIAL CONTAINER, AND BOARD MOUNTED ON PRINTING MATERIAL CONTAINER

CROSS-REFERENCE TO RELATED APPLICATIONS

This application is a continuation of application Ser. No. 17/670,177, filed on Feb. 11, 2022, which is a continuation of application Ser. No. 17/036,780, filed on Sep. 29, 2020, now U.S. Pat. No. 11,279,138, which is a continuation of application Ser. No. 16/824,546 filed on Mar. 19, 2020, now U.S. Pat. No. 10,836,173, which is a continuation of application Ser. No. 16/289,094, filed on Feb. 28, 2019, now U.S. Pat. No. 10,625,510, which is a continuation of application Ser. No. 15/332,070, filed on Oct. 24, 2016, now U.S. Pat. No. 10,259,230, which is a continuation of application Ser. No. 15/171,793, filed on Jun. 2, 2016, now U.S. Pat. No. 9,505,226, which was a division of application Ser. No. 14/922,889, filed on Oct. 26, 2015, now U.S. Pat. No. 9,381,750 which is a continuation of application Ser. No. 14/518,618, filed on Oct. 20, 2014, now U.S. Pat. No. 9,180,675, which is a continuation of application Ser. No. 14/332,973 filed on Jul. 16, 2014, now U.S. Pat. No. 8,882,513, which is a continuation of application Ser. No. 14/194,120 filed on Feb. 28, 2014, now U.S. Pat. No. 8,801,163, which is a continuation of application Ser. No. 13/902,171, filed on May 24, 2013, now U.S. Pat. No. 8,794,749, which is a continuation of application Ser. No. 13/608,658, filed on Sep. 10, 2012, now U.S. Pat. No. 8,454,116, which is a continuation of application Ser. No. 12/257,914, filed Oct. 24, 2008, now U.S. Pat. No. 8,366,233, which is a continuation of application Ser. No. 12/040,308, filed on Feb. 29, 2008, now U.S. Pat. No. 7,484,825, which is a continuation of application Ser. No. 11/611,641, filed on Dec. 15, 2006, now U.S. Pat. No. 7,562,958.

This application relates to and claims priority from Japanese Patent Applications No. 2005-372028, filed on Dec. 26, 2005 and No. 2006-220751, filed on Aug. 11, 2006, the entire disclosures of which are incorporated by reference herein.

BACKGROUND

Technical Field

The present invention relates in general to a printing material container containing a printing material and a board mounted on the printing material container, and relates in particular to an arrangement for a plurality of terminals disposed on these components.

Description of the Related Art

In recent years, it has become common practice to equip ink cartridges used in ink jet printers or other printing apparatus, with a device, for example, a memory for storing information relating to the ink. Also disposed on such ink cartridges is another device, for example, a high voltage circuit (e.g. a remaining ink level sensor using a piezoelectric element) applied to higher voltage than the driving voltage of the memory. In such cases, there are instances in which the ink cartridge and the printing apparatus are electrically connected through terminals. There is proposed a structure for preventing the information storage medium from shorting and becoming damaged due to a drop of liquid being deposited on the terminals connecting the printing apparatus with the storage medium furnished to the ink cartridge.

However, the technologies mentioned above do not contemplate an ink cartridge having equipped with a plurality of devices, for example, a memory and a high voltage circuit, with terminals for one device and the terminals for another device. With this kind of cartridge, there was a risk that shorting could occur between a terminal for the one device and the terminal for the another device. Such shorting caused the problem of possible damage to the ink cartridge or to the printing apparatus in which the ink cartridge is attached. This problem is not limited to ink cartridges, but is a problem common to receptacles containing other printing materials, for example, toner.

SUMMARY

An advantage of some aspects of the present invention is to provide a printing material container having a plurality of devices, wherein damage to the printing material container and the printing apparatus caused by shorting between terminals can be prevented or reduced.

A first aspect of the invention provides a printing material container detachably attachable to a printing apparatus having a plurality of apparatus-side terminals. The printing material container pertaining to the first aspect of the invention comprises a first device, a second device and a terminal group that includes a plurality of first terminals, at least one second terminal and at least one third terminal. The plurality of first terminals are connected to the first device and respectively include a first contact portion for contacting a corresponding terminal among the plurality of apparatus-side terminals. The at least one second terminal is connected to the second device and includes a second contact portion for contacting a corresponding terminal among the plurality of apparatus-side terminals. The at least one third terminal is for the detection of shorting between the at least one second terminal and the at least one third terminal and includes a third contact portion for contacting a corresponding terminal among the plurality of apparatus-side terminals. The at least one second contact portion, the plurality of the first contact portions, and the at least one third contact portion are arranged so as to form one or multiple rows. The at least one second contact portion is arranged at an end of one row among the one or multiple rows.

According to the printing material container pertaining to the first aspect of the invention, the second contact portions of the second terminals connected to the second device are arranged at the ends, whereby other contact portions adjacent to the second contact portions are fewer in number, and consequently the second terminals have less likelihood of shorting to terminals include other contact portions. Accordingly, damage to the printing material container or printing apparatus caused by such shorting can be prevented or reduced.

A second aspect of the invention provides printing material container detachably mountable to a printing apparatus having a plurality of apparatus-side terminals. The printing material container pertaining to the second aspect of the invention comprises a first device, a second device, a group of terminals for connection to the apparatus-side terminals and comprising a plurality of first terminals, at least one second terminal, and at least one third terminal. The plurality of first terminals are connected to the first device. The at least one second terminal is connected to the second device. At least a portion of the at least one third terminal is arranged relative to at least a portion of the at least one second terminal, without a said first terminal therebetween in at least one direction, for the detection of shorting between the at least one second terminal and the at least one third terminal.

According to the printing material container pertaining to the second aspect of the invention, at least a portion of the at least one third terminal is arranged relative to at least a portion of the at least one second terminal, without a said first terminal therebetween in at least one direction. As a result, shorting between the portion of the at least one third terminal and the portion of the at least one second terminal have a greater tendency to occur than shorting between the first terminal and the second terminal. Accordingly, in the event that the shorting between the first terminal and the second terminal occurs by a drop of ink or foreign matter, it is highly likely that the shorting between the portion of the at least one third terminal and the portion of the at least one second terminal also occurs, and is detected as anomaly. As a result, damage to the printing material container or printing apparatus caused by a shorting between the first terminal and the second terminal can be prevented or reduced.

A third aspect of the invention provides a printing material container detachably mountable to a printing apparatus having a plurality of apparatus-side terminals. The printing material container pertaining to the third aspect of the invention comprises a first device, a second device, a group of terminals for connection to the apparatus-side terminals and comprising a plurality of first terminals, at least one second terminal, and at least one third terminal. The plurality of first terminals are connected to the first device. The at least one second terminal is connected to the second device. The at least one third terminal is for the detection of shorting between the at least one second terminal and the at least one third terminal. At least a portion of the at least one third terminal is located adjacently to at least a portion of the at least one second terminal in at least one direction.

According to the printing material container pertaining to the third aspect of the invention, at least a portion of the at least one third terminal is located adjacently to at least a portion of the at least one second terminal. As a result, shorting between the portion of the at least one third terminal and the portion of the at least one second terminal have a greater tendency to occur than shorting between the first terminal and the second terminal. Accordingly, in the event that the shorting between the first terminal and the second terminal occurs by a drop of ink or foreign matter, it is highly likely that the shorting between the portion of the at least one third terminal and the portion of the at least one second terminal also occurs, and is detected as anomaly. As a result, damage to the printing material container or printing apparatus caused by a shorting between the first terminal and the second terminal can be prevented or reduced.

A fourth aspect of the invention provides printing material container detachably mountable to a printing apparatus having a apparatus-side terminal group. The apparatus-side terminal group includes a plurality of first apparatus-side terminals, a plurality of second apparatus-side terminals, and a plurality of third apparatus-side terminals. Terminals within the apparatus-side terminal group are arranged so as to form a first row and second row. The plurality of second apparatus-side terminals are respectively arranged at each end of the first row and the third apparatus-side terminals are respectively arranged at each end of the second row. Each of the second apparatus-side terminals is adjacent to any of the third apparatus-side terminals. The printing material container pertaining to the fourth aspect of the invention comprises a first device, a second device, a group of terminals comprising a plurality of first terminals, at least one second terminal, and at least one third terminal. The plurality of first terminals are connected to the first device and are respectively contactable to a corresponding terminal among the first apparatus-side terminals. The at least one second terminal is connected to the second device and is respectively contactable to a corresponding terminal among the second apparatus-side terminals. The at least one third terminal is for the detection of shorting between the at least one second terminal and the at least one third terminal and is respectively contactable to a corresponding terminal among the third apparatus-side terminals.

The printing material container pertaining to the fourth aspect of the invention can afford working effects analogous to those of the printing material container pertaining to the first aspect. The printing material container pertaining to the fourth aspect of the invention may be reduced to practice in various forms, in the same manner as the printing material container which pertaining to the first aspect.

A fifth aspect of the invention provides a printing material container detachably attachable to a printing apparatus having a plurality of apparatus-side terminals. The printing material container pertaining to the fifth aspect of the invention comprises a first device, a second device, and a terminal group that includes a plurality of first terminals, at least one second terminal and at least one third terminal. The plurality of first terminals are connected to the first device. The at least one second terminal is connected to the second device. The at least one third terminal is for the detection of shorting between the at least one second terminal and the at least one third terminal. Each of the terminals has an circumferential edge, a portion of the circumferential edge of the third terminal facing a portion of the circumferential edge of the second terminal and a portion of the circumferential edge of the one first terminal facing another portion of the circumferential edge of the second terminal. The length of the portion of circumferential edge of the third terminal is longer than that of the portion of the circumferential edge of the one first terminal.

According to the printing material container pertaining to the fifth aspect of the invention, the length of the portion of circumferential edge of the third terminal is longer than that of the portion of the circumferential edge of the one first terminal. As a result, shorting between the third terminal and the second terminal have a greater tendency to occur than shorting between the first terminal and the second terminal. Accordingly, in the event that the shorting between the first terminal and the second terminal occurs by a drop of ink or foreign matter, it is highly likely that the shorting between the portion of the at least one third terminal and the portion of the at least one second terminal also occurs, and is detected as anomaly. As a result, damage to the printing material container or printing apparatus caused by a shorting between the first terminal and the second terminal can be prevented or reduced.

A sixth aspect of the invention provides a board mountable on a printing material container detachably attachable to a printing apparatus that has a plurality of apparatus-side terminals. The printing material container has second device. The board pertaining to the sixth aspect of the invention comprises a first device and a terminal group that includes a plurality of first terminals, at least one second terminal and at least one third terminal. The plurality of first terminals are connected to the first device and respectively include a first contact portion for contacting a corresponding terminal among the plurality of apparatus-side terminals.

The at least one second terminal is connectable to the second device and includes a second contact portion for contacting a corresponding terminal among the plurality of apparatus-side terminals. The at least one third terminal is for the detection of shorting between the at least one second terminal and the at least one third terminal and includes a third contact portion for contacting a corresponding terminal among the plurality of apparatus-side terminals. The at least one second contact portion, the plurality of the first contact portions, and the at least one third contact portion are arranged so as to form one or multiple rows. The at least one second contact portion is arranged at an end of one row among the one or multiple rows.

A seventh aspect of the invention provides a board mountable on a printing material container detachably attachable to a printing apparatus that has a plurality of apparatus-side terminals. The printing material container has second device. The board pertaining to the seventh aspect of the invention comprises a first device and a group of terminals for connection to the apparatus-side terminals and comprising a plurality of first terminals, at least one second terminal, and at least one third terminal. The plurality of first terminals are connected to the first device. The at least one second terminal is connected to the second device. At least a portion of the at least one third terminal is arranged relative to at least a portion of the at least one second terminal, without a said first terminal therebetween in at least one direction, for the detection of shorting between the at least one second terminal and the at least one third terminal.

A eighth aspect of the invention provides a board mountable on a printing material container detachably attachable to a printing apparatus that has a plurality of apparatus-side terminals. The printing material container has second device. The board pertaining to the eighth aspect of the invention comprises a first device and a group of terminals for connection to the apparatus-side terminals and comprising a plurality of first terminals, at least one second terminal, and at least one third terminal. The plurality of first terminals are connected to the first device. The at least one second terminal is connected to the second device. The at least one third terminal is for the detection of shorting between the at least one second terminal and the at least one third terminal. At least a portion of the at least one third terminal is located adjacently to at least a portion of the at least one second terminal in at least one direction.

A ninth aspect of the invention provides a board mountable on a printing material container detachably attachable to a printing apparatus having a apparatus-side terminal group that includes a plurality of first apparatus-side terminals, a plurality of second apparatus-side terminals, and a plurality of third apparatus-side terminals. Terminals within the apparatus-side terminal group are arranged so as to form a first row and second row. The plurality of second apparatus-side terminals are respectively arranged at each end of the first row and the third apparatus-side terminals are respectively arranged at each end of the second row. Each of the second apparatus-side terminals is adjacent to any of the third apparatus-side terminals. The printing material container has second device. The board pertaining to the ninth aspect of the invention comprises a first device and a group of terminals comprising a plurality of first terminals, at least one second terminal, and at least one third terminal. The plurality of first terminals are connected to the first device and are respectively contactable to a corresponding terminal among the first apparatus-side terminals. The at least one second terminal is connected to the second device and is respectively contactable to a corresponding terminal among the second apparatus-side terminals. The at least one third terminal is for the detection of shorting between the at least one second terminal and the at least one third terminal and is respectively contactable to a corresponding terminal among the third apparatus-side terminals.

A tenth aspect of the invention provides a board mountable on a printing material container detachably attachable to a printing apparatus that has a plurality of apparatus-side terminals. The printing material container has second device. The board pertaining to the tenth aspect of the invention comprises a first device and a terminal group that includes a plurality of first terminals, at least one second terminal and at least one third terminal. The plurality of first terminals are connected to the first device. The at least one second terminal is connected to the second device. The at least one third terminal is for the detection of shorting between the at least one second terminal and the at least one third terminal. Each of the terminals has an circumferential edge, a portion of the circumferential edge of the third terminal facing a portion of the circumferential edge of the second terminal and a portion of the circumferential edge of the one first terminal facing another portion of the circumferential edge of the second terminal. The length of the portion of circumferential edge of the third terminal is longer than that of the portion of the circumferential edge of the one first terminal.

An eleventh aspect of the invention provides a board mountable on a printing material container detachably attachable to a printing apparatus that has a plurality of apparatus-side terminals. The printing material container has a second device. The board pertaining to the eleventh aspect of the invention comprises a first device and a terminal group that includes at least a plurality of first terminals, at least one cut-out portions into which a respective second terminal mounted on the printing material container can be inserted and at least one third terminal. The plurality of first terminals are connectable to the first device and respectively include a first contact portion for contacting a corresponding terminal among the plurality of apparatus-side terminals. The at least one second terminal is connectable to the second device and includes a second contact portion for contacting a corresponding terminal among the plurality of apparatus-side-terminals. The at least one third terminal is for the detection of shorting between the at least one second terminal and the at least one third terminal and includes a third contact portion for contacting a corresponding terminal among the plurality of apparatus-side terminals. When mounted on the printing material container, the at least one third contact portion is located adjacently to the at least one second contact portion. When mounted on the printing material container, the at least one second contact portion, the plurality of the first contact portions, and the at least one third contact portion are arranged so as to form one or multiple rows. When mounted on the printing material container, the at least one second contact portion is arranged at an end of one row among the one or multiple rows.

A twelfth aspect of the invention provides a board connectable to a printing apparatus that has a plurality of apparatus-side terminals. The board pertaining to the twelfth aspect of the invention comprises a terminal group that includes a plurality of first terminals, at least one second terminal and at least one third terminal. The plurality of first terminals are connected to a first device and respectively include a first contact portion for contacting a corresponding terminal among the plurality of apparatus-side terminals. The at least one second terminal is connectable to a second device and includes a second contact portion for contacting a corresponding terminal among the plurality of apparatus-side terminals. The at least one third terminal is for the detection of shorting between the at least one second terminal and the at least one third terminal and includes a third contact portion for contacting a corresponding terminal among the plurality of apparatus-side terminals. The at least one second contact portion, the plurality of the first contact portions, and the at least one third contact portion are arranged so as to form one or multiple rows. The at least one second contact portion is arranged at an end of one row among the one or multiple rows.

The boards pertaining to the sixth to the twelfth aspects of the invention can afford working effects analogous to those of the printing material container pertaining to the first to the fifth aspects respectively. The boards pertaining to the sixth to eleventh aspects may be reduced to practice in various forms, in the same manner as the printing material container pertaining to the first to the fifth aspects respectively.

The above and other objects, characterizing features, aspects and advantages of the present invention will be clear from the description of preferred embodiments presented below along with the attached figures.

DETAILED DESCRIPTION OF THE PREFERRED EMBODIMENTS

Embodiments of the present invention will be described below with reference to the drawings.

A. Embodiment

Figure 1:
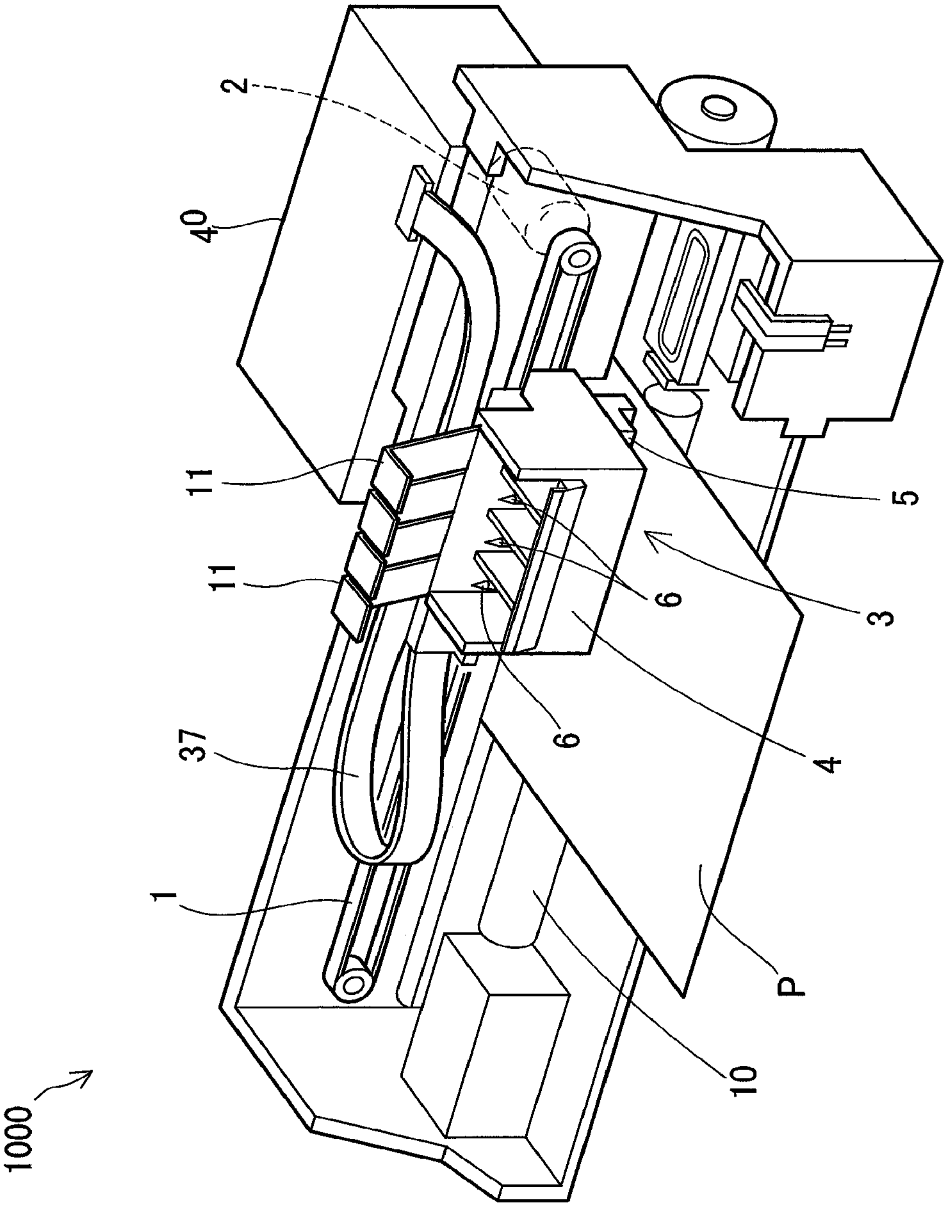
FIG. 1 shows a perspective view of the construction of the printing apparatus pertaining to an embodiment of the invention.

Arrangement of Printing apparatus and Ink Cartridge:

FIG. 1 shows a perspective view of the construction of the printing apparatus pertaining to an embodiment of the invention. The printing apparatus 1000 has a sub-scan feed mechanism, a main scan feed mechanism, and a head drive mechanism. The sub-scan feed mechanism carries the printing paper P in the sub-scanning direction using a paper feed roller 10 powered by a paper feed motor, not shown. The main scan feed mechanism uses the power of a carriage motor 2 to reciprocate in the main scanning direction a carriage 3 connected to a drive belt. The head drive mechanism drives a print head 5 mounted on the carriage 3, to eject ink and form dots. The printing apparatus 1000 additionally comprises a main control circuit 40 for controlling the various mechanisms mentioned above. The main control circuit 40 is connected to the carriage 3 via a flexible cable 37.

The carriage 3 comprises a holder 4, the print head 5 mentioned above, and a carriage circuit, described later. The holder 4 is designed for attachment of a number of ink cartridges, described later, and is situated on the upper face of the print head 5. In the example depicted in FIG. 1, the holder 4 is designed for attachment of four ink cartridges, e.g. individual attachment of four types of ink cartridge containing black, yellow, magenta, and cyan ink. Four openable and closable covers 11 are attached to the holder 4 for each attached ink cartridge. Also disposed on the upper face of the print head 5 are ink supply needles 6 for supplying ink from the ink cartridges to the print head 5.

Figure 2:
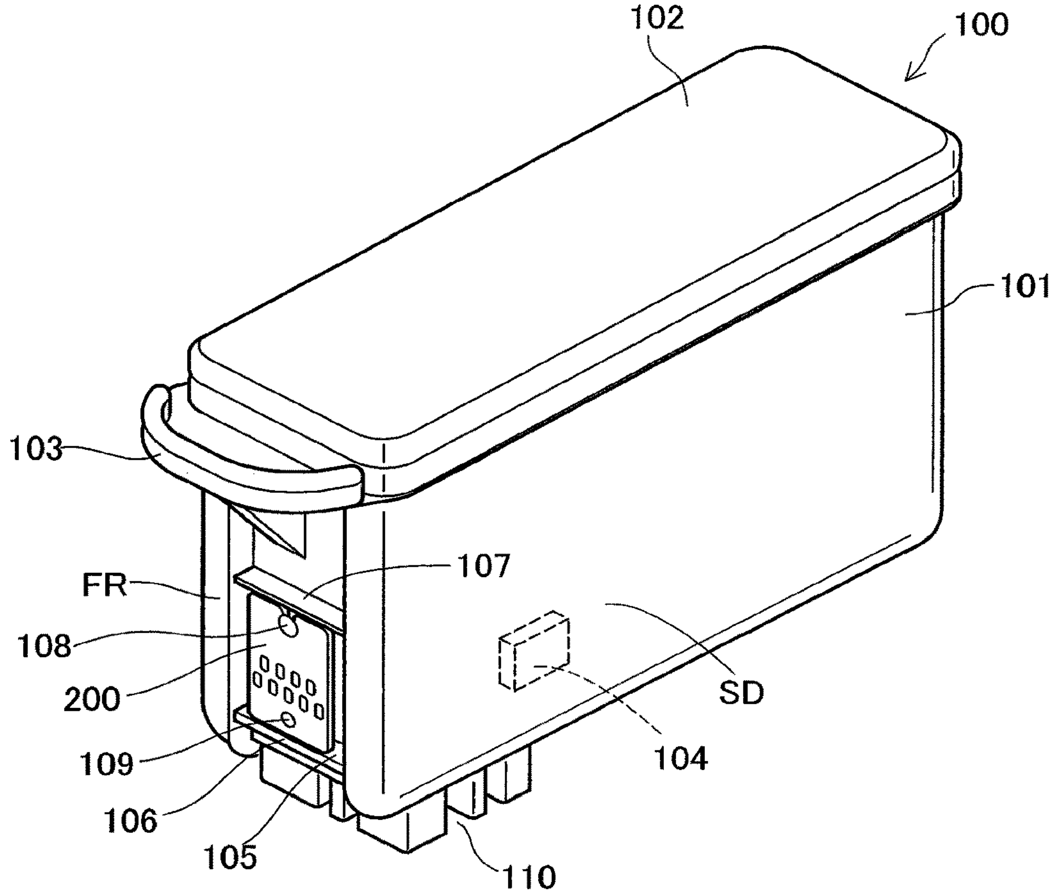
FIG. 2 shows a perspective view of the construction of the ink cartridge pertaining to the embodiment.
Figure 3A:
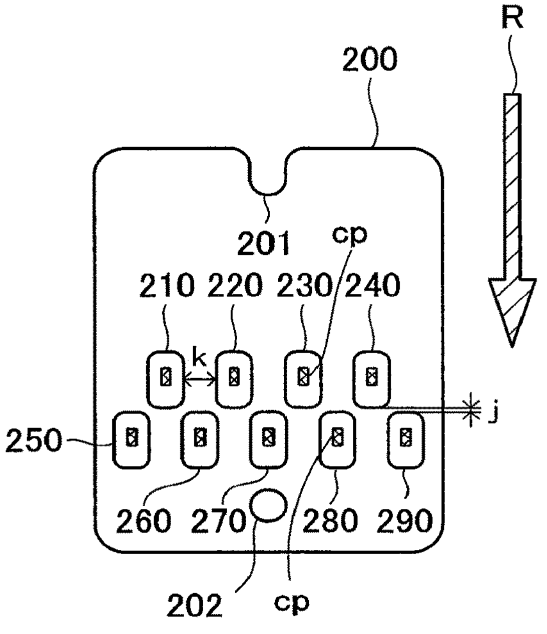
FIGS. 3A-B show diagrams of the construction of the board pertaining to the embodiment.
Figure 3B:
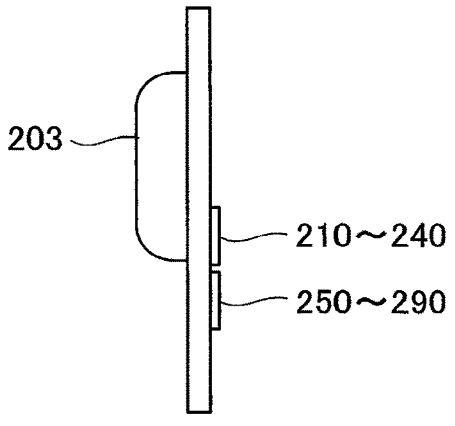
Figure 4:
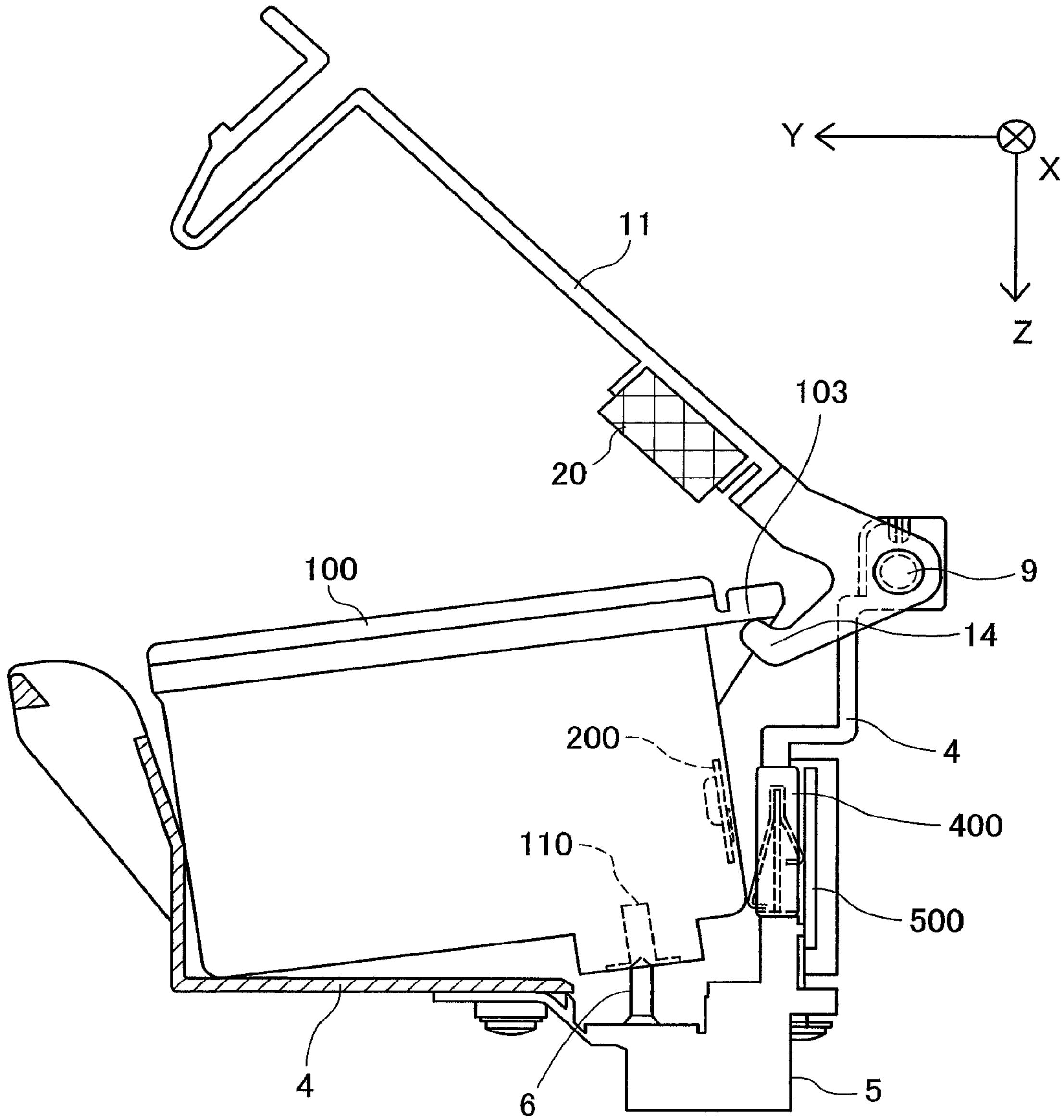
FIG. 4 shows an illustration showing attachment of the ink cartridge in the holder.
Figure 5:
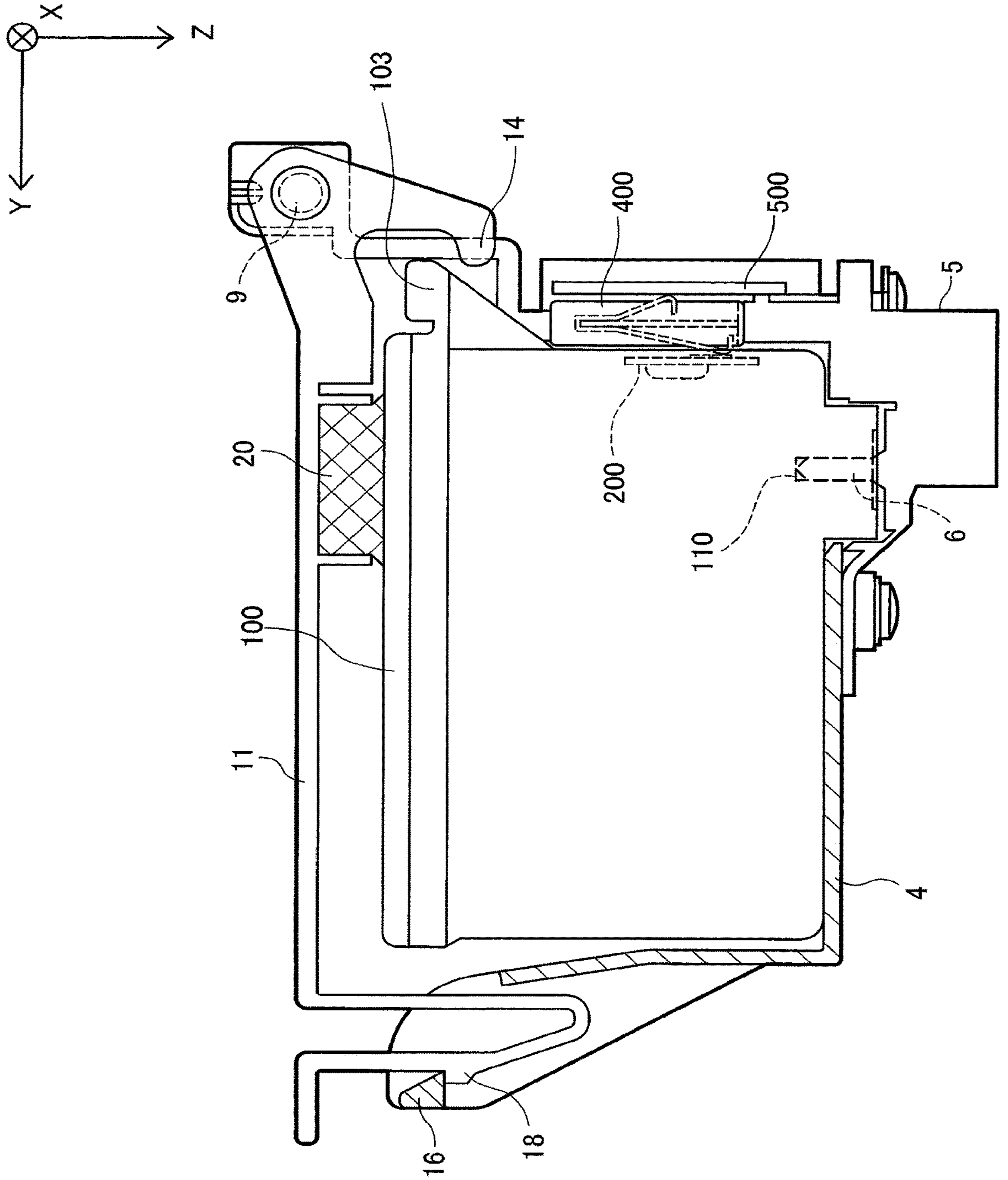
FIG. 5 shows an illustration showing the ink cartridge attached to the holder.

The construction of the ink cartridge pertaining to the embodiment will now be described with reference of FIGS. 2-5. FIG. 2 shows a perspective view of the construction of the ink cartridge pertaining to the embodiment. FIGS. 3A-B show diagrams of the construction of the board pertaining to the embodiment. FIG. 4 shows an illustration showing attachment of the ink cartridge in the holder. FIG. 5 shows an illustration showing the ink cartridge attached to the holder. The ink cartridge 100 attached to the holder 4 comprises a housing 101 containing ink, a lid 102 providing closure to the opening of the housing 101, a board 200, and a sensor 104. On the bottom face of the housing 101 there is formed an ink supply orifice 110 into which the aforementioned ink supply needle 6 inserts when ink cartridge 100 is attached to the holder 4. At the upper edge of the front face FR of the housing 101 there is formed a flared section 103. On the lower side of the center of the front face FR of the housing 101 there is formed a recess 105 bounded by upper and lower ribs 107, 106. The aforementioned board 200 fits into this recess 105. The sensor 104 is located in the region posterior to the board 200. The sensor 104 is used to detect remaining ink level, as will be described later.

FIG. 3A depicts the arrangement on the surface of the board 200. This surface is the face that is exposed to the outside when the board 200 is mounted on the ink cartridge 100. FIG. 3B depicts the board 200 viewed from the side. A boss slot 201 is formed at the upper edge of the board 200, and a boss hole 202 is formed at the lower edge of the board 200. As shown in FIG. 1, with the board 200 attached to the recess 105 of the housing 101, bosses 108 and 109 formed on the lower face of the recess 105 mate with the boss slot 201 and the boss hole 202 respectively. The distal ends of the bosses 108 and 109 are crushed to effect caulking. The board 200 is secured within the recess 105 thereby.

The following description of attachment of the ink cartridge 100 makes reference to FIG. 4 and FIG. 5. As depicted in FIG. 4, the cover 11 is designed to be rotatable about a rotating shaft 9. With the cover 11 rotated upward to the open position, when the ink cartridge 100 is being attached to the holder, the flared section 103 of the ink cartridge is received by a projection 14 of the cover 11. When the cover 11 is closed from this position, the projection 14 rotates downward, and the ink cartridge 100 descends downward (in the Z direction in FIG. 4). When the cover 11 is completely closed, a hook 18 of the cover 11 interlocks with a hook 16 of the holder 4. With the cover 11 completely closed, the ink cartridge 100 is secured pressed against the holder 4 by an elastic member 20. Also, with the cover 11 completely closed, the ink supply needle 6 inserts into the ink supply orifice 110 of the ink cartridge 100, and the ink contained in the ink cartridge 100 is supplied to the printing apparatus 1000 via the ink supply needle 6. As will be apparent from the preceding description, the ink cartridge 100 is attached to the holder 4 by means of inserting it so as to move in the forward direction of the Z axis in FIG. 4 and FIG. 5. The forward direction of the Z axis in FIG. 4 and FIG. 5 shall also be referred to as insertion direction of the ink cartridge 100.

Returning to FIG. 3, the board 200 shall be described further. The arrow R in FIG. 3 (*a*) indicates the insertion direction of the ink cartridge 100 discussed above. As depicted in FIG. 3, the board 200 comprises a memory 203 disposed on its back face, and a terminal group composed of nine terminals 210-290 disposed on its front face. The memory 203 stores information relating to the ink contained in the ink cartridge 100. The terminals 210-290 are generally rectangular in shape, and are arranged in two rows generally orthogonal to the insertion direction R. Of the two rows, the row on the insertion direction R side, i.e. the row situated on the lower side in FIG. 3 (*a*), shall be termed the lower row, and the row on the opposite side from the insertion direction R, i.e. the row situated on the upper side in FIG. 3 (*a*), shall be termed the upper row. The terminals arranged so as to form the upper row consist, in order from left in FIG. 3 (*a*), of a first short detection terminal 210, a ground terminal 220, a power supply terminal 230, and a second short detection terminal 240. The terminals arranged so as to form the lower row consist, in order from left in FIG. 3 (*a*), of a first sensor drive terminal 250, a reset terminal 260, a clock terminal 270, a data terminal 280, and a second sensor drive terminal 290. As depicted in FIG. 3, each of the terminals 210-290 contains in its center portion a contact portion CP for contacting a corresponding terminal among the plurality of apparatus-side terminals, described later.

The terminals 210-240 forming the upper row and the terminals 250-290 forming the lower row are arranged differently from one another, constituting a so-called staggered arrangement, so that the terminal centers do not line up with one another in the insertion direction R. As a result, the contact portions CP of the terminals 210-240 forming the upper row and the contact portions CP of the terminals 250-290 forming the lower row are similarly arranged differently from one another, constituting a so-called staggered arrangement.

As will be appreciated from FIG. 3A, the first sensor drive terminal 250 is situated adjacently to two other terminals (the reset terminal 260 and the first short detection terminal 210), and of these, the first short detection terminal 210 for detecting shorting is positioned closest to the first sensor drive terminal 250. Similarly, the second sensor drive terminal 290 is situated adjacently to two other terminals (the second short detection terminal 240 and the data terminal 280), and of these, the second short detection terminal 240 for detecting shorting is positioned closest to the second sensor drive terminal 290.

With regard to relationships among the contact portions CP, the contact portion CP of the first sensor drive terminal 250 is situated adjacently to the contact portions CP of two other terminals (the reset terminal 260 and the first short detection terminal 210). Similarly, the contact portion CP of the second sensor drive terminal 290 is situated adjacently to the contact portions CP of two other terminals (the second short detection terminal 240 and the data terminal 280).

As will be appreciated from FIG. 3A, the first sensor drive terminal 250 and the second sensor drive terminal 290 are situated at the ends of the lower row, i.e. at the outermost positions in the lower row. The lower row is composed of a greater number of terminals than the upper row, and the length of the lower row in the direction orthogonal to the insertion direction R is greater than the length of the upper row, and consequently of all the terminals 210-290 contained in the upper and lower rows, the first sensor drive terminal 250 and the second sensor drive terminal 290 are situated at the outermost positions viewed in the direction orthogonal to the insertion direction R.

With regard to relationships among the contact portions CP, the contact portion CP of the first sensor drive terminal 250 and the contact portion CP of the second sensor drive terminal 290 are respectively situated at the ends of the lower row formed by the contact portions CP of the terminals, i.e., at the outermost positions in the lower row. Among the contact portions of all the terminals 210-290 contained in the upper and lower rows, the contact portion CP of the first sensor drive terminal 250 and the contact portion CP of the second sensor drive terminal 290 are situated at the outermost positions viewed in the direction orthogonal to the insertion direction R.

As will be appreciated from FIG. 3A, the first short detection terminal 210 and the second short detection terminal 240 are respectively situated at the ends of the upper row, i.e., at the outermost positions in the upper row. As a result, the contact portion CP of the first short detection terminal 210 and the contact portion CP of the second short detection terminal 240 are similarly located at the ends of the upper row formed by the contact portions CP of the terminals, i.e. at the outermost positions in the upper row. Consequently, as will be discussed later, the terminals 220, 230, 260, 270 and 280 connected to the memory 203 are situated between the first short detection terminal 210 and the first sensor drive terminal 250, and the second short detection terminal 240 and the second sensor drive terminal 290, located to either side.

In the embodiment, the board 200 has width of approximately 12.8 mm in the insertion direction R, width of the approximately 10.1 mm in the direction orthogonal to the insertion direction R, and thickness of approximately 0.71 mm. The terminals 210-290 each have width of approximately 1.8 mm in the insertion direction R and width of approximately 1.05 mm in the direction orthogonal to the insertion direction R. The dimension values given here are merely exemplary, with differences on the order of ±0.5 mm being acceptable, for example. The spacing between adjacent terminals in a given row (the lower row or the upper row), for example the interval K between the first short detection terminal 210 and the ground terminal 220, is 1 mm for example. With regard to spacing among terminals, differences on the order of ±0.5 mm are acceptable, for example. The interval J between the upper row and the lower row is about 0.2 mm. With regard to spacing among rows, differences on the order off 0.3 mm are acceptable, for example.

As depicted in FIG. 5, with the ink cartridge 100 attached completely within the holder 4, the terminals 210-290 of the board 200 are electrically connected to a carriage circuit 500 via a contact mechanism 400 disposed on the holder 4. The contact mechanism 400 shall be described briefly making reference to FIGS. 6A-B.

Figure 6B:
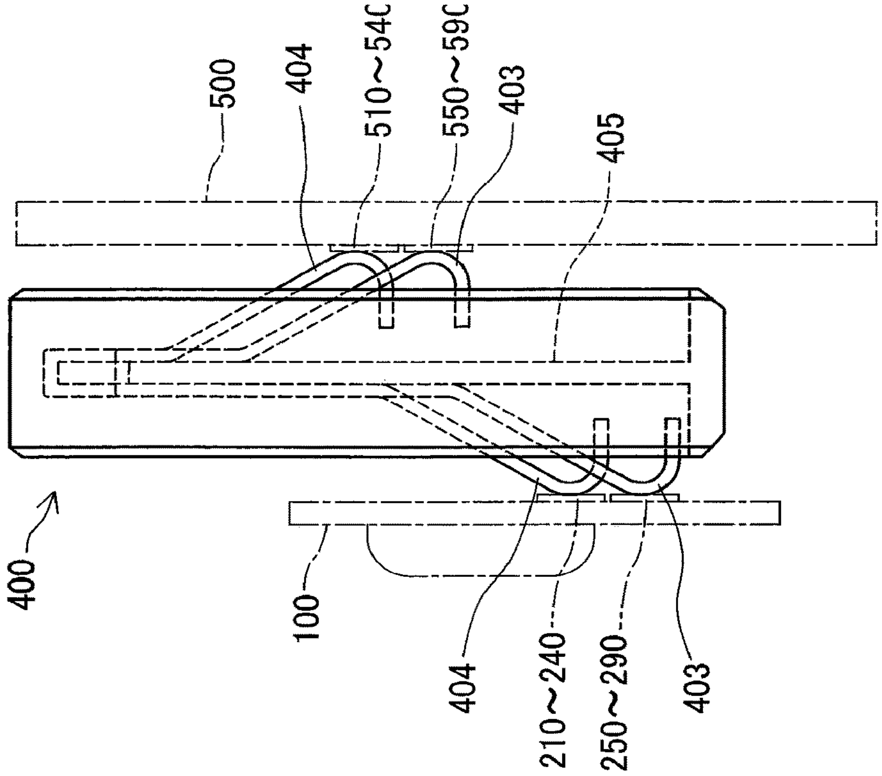
FIGS. 6A-B show schematics of the construction of the contact mechanism.
Figure 6A:
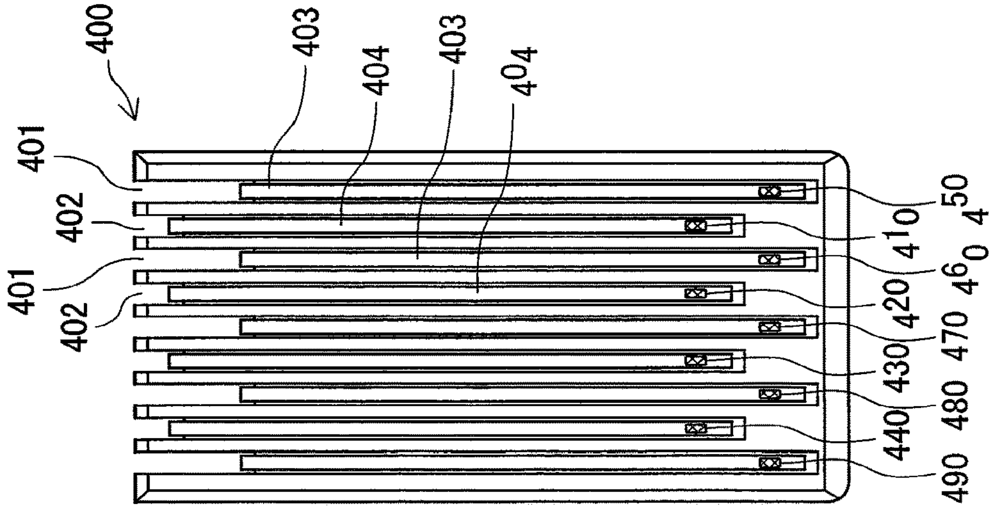

FIGS. 6A-B show schematics of the construction of the contact mechanism 400. The contact mechanism 400 has multiple slits 401, 402 of two types that differ in depth, formed in alternating fashion at substantially constant pitch in correspondence with the terminals 210-290 on the board 200. Within each slit 401, 402 there fits a contact forming member 403, 404 endowed with electrical conductivity and resistance. Of the two ends of each contact forming member 403 and 404, the end exposed to the inside of the holder is placed in resilient contact with a corresponding terminal among the terminals 210-290 on the board 200. In FIG. 6A, portions 410-490 which are the portions of the contact forming members 403 and 404 that contact the terminals 210-290 are shown. Specifically, the portions 410-490 that contact the terminals 210-290 function as apparatus-side terminals for electrically connecting the printing apparatus 1000 with the terminals 210-290. The portions 410-490 that contact the terminals 210-290 shall hereinafter be termed apparatus-side terminals 410-490. With the ink cartridge 100 attached to the holder 4, the apparatus-side terminals 410-490 respectively contact the contact portions CP of the terminals 210-290 described above (FIG. 3A).

On the other hand, of the two ends of each contact forming member 403 and 404, the end lying exposed on the exterior of the holder 4 is placed in resilient contact with a corresponding terminal among the terminals 510-590 furnished to the carriage circuit 500.

Figure 7:
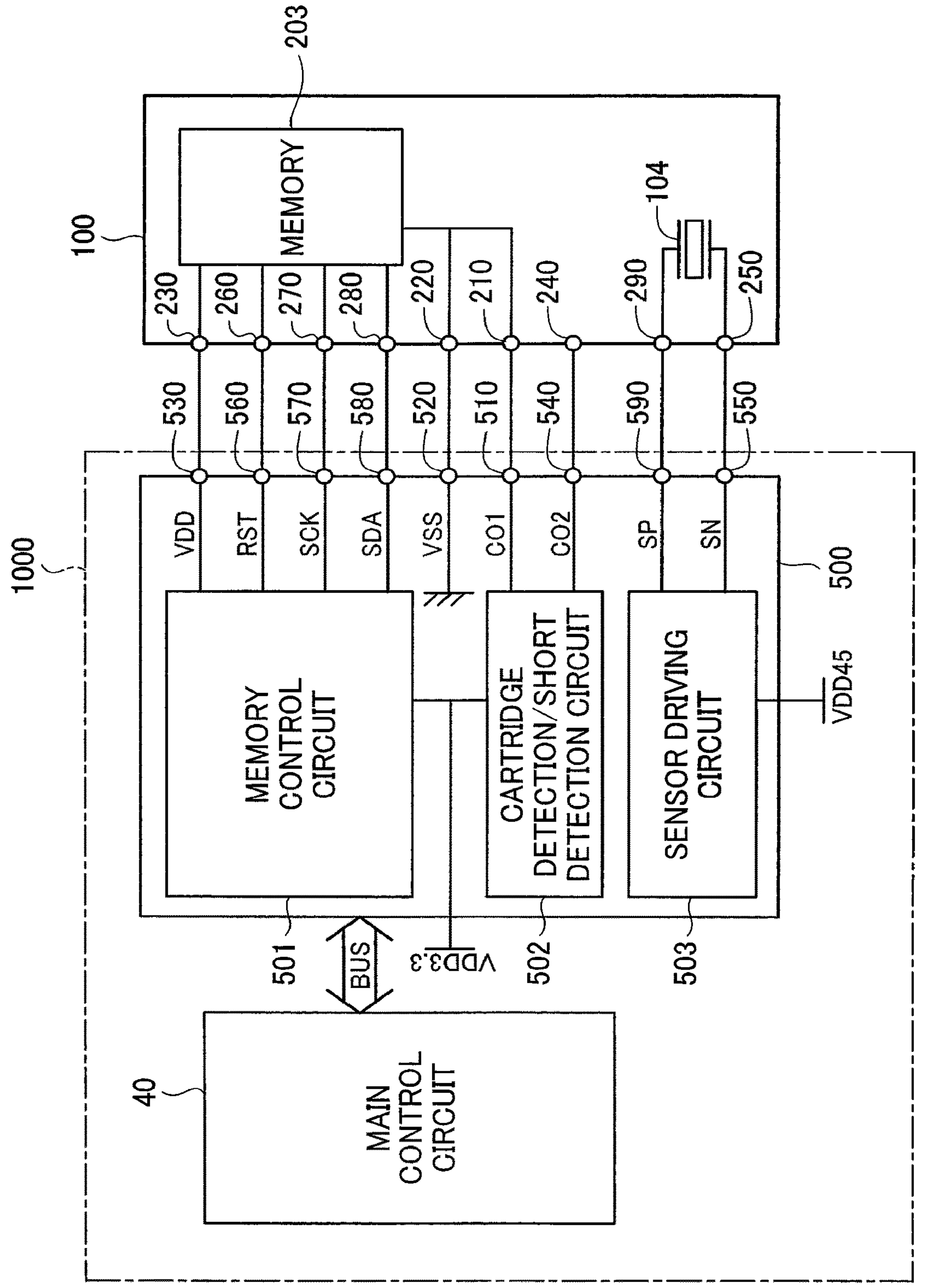
FIG. 7 shows a brief diagram of the electrical arrangement of the ink cartridge and the printing apparatus.
Figure 8:
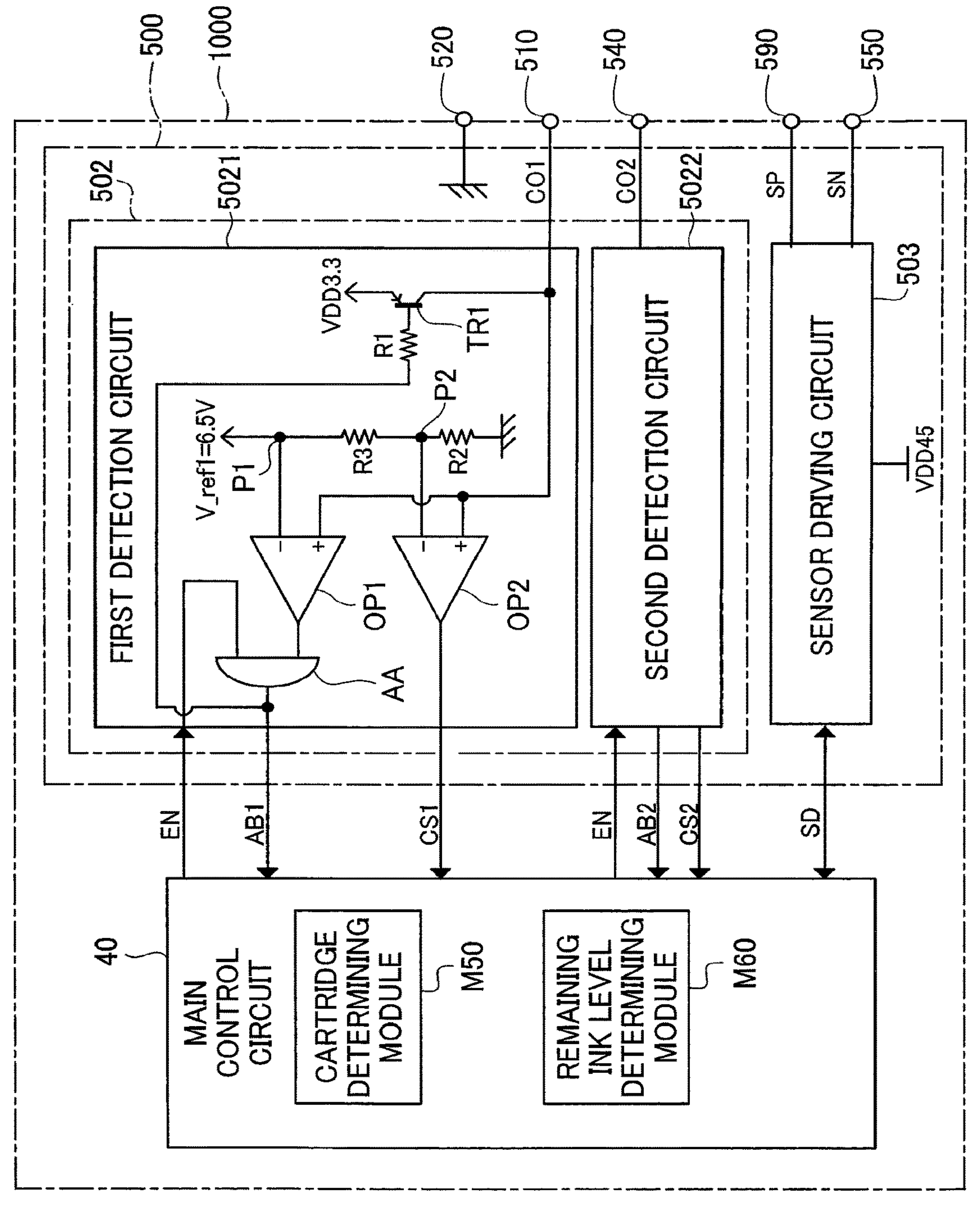
FIG. 8 shows a brief diagram of the electrical arrangement, focusing on the cartridge detection/short detection circuit.

The electrical arrangements of the ink cartridge 100 and the printing apparatus will now be described, focusing on the part relating to the ink cartridge 100, with reference to FIG. 7 and FIG. 8. FIG. 7 shows a brief diagram of the electrical arrangement of the ink cartridge and the printing apparatus. FIG. 8 shows a brief diagram of the electrical arrangement, focusing on the cartridge detection/short detection circuit.

First, the electrical arrangement of the ink cartridge 100 shall be described. Of the terminals of the board 200 described with reference to FIG. 3, the ground terminal 220, the power supply terminal 230, the reset terminal 260, the clock terminal 270 and the data terminal 280 are electrically connected to the memory 203. The memory 203 is, for example, EEPROM comprising serially accessed memory cells, and performing data read/write operations in sync with a clock signal. The ground terminal 220 is grounded via a terminal 520 on the printing apparatus 1000 side. The reset terminal 260 is electrically connected to a terminal 560 of the carriage circuit 500, and is used to supply a reset signal RST to the memory 203 from the carriage circuit 500. The clock terminal 270 is electrically connected to a terminal 570 of the carriage circuit 500, and is used to supply the clock signal CLK to the memory 203 from the carriage circuit 500. The data terminal 280 is electrically connected to a terminal 580 of the carriage circuit 500, and is used for exchange of data signals SDA between the carriage circuit 500 and the memory 203.

Of the terminals of the board 200 described with reference to FIG. 3, either the first short detection terminal 210, the second short detection terminal 240, or both are electrically connected with the ground terminal 220. In the example depicted in FIG. 7, it will be apparent that the first short detection terminal 220 is electrically connected to the ground terminal 220. The first short detection terminal 210 and the second short detection terminal 240 are electrically connected respectively to the terminals 510, 540 of the carriage circuit 500, and used for cartridge detection and short detection, described later.

In the embodiment, a piezoelectric element is used as the sensor 104. The remaining ink level can be detected by applying driving voltage to the piezoelectric element to induce the piezoelectric element to vibrate through the inverse piezoelectric effect, and measuring the vibration frequency of the voltage produced by the piezoelectric effect of the residual vibration. Specifically, this vibration frequency represents the characteristic frequency of the surrounding structures (e.g. the housing 101 and ink) that vibrate together with the piezoelectric element. The characteristic frequency changes depending on the amount of ink remaining within the ink cartridge, so the remaining ink level can be detected by measuring this vibration frequency. Of the terminals of the board 200 described with reference to FIG. 3, the second sensor drive terminal 290 is electrically connected to one electrode of the piezoelectric element used as the sensor 104, and the first sensor drive terminal 250 is electrically connected to the other electrode. These terminals 250, 290 are used for exchange of sensor driving voltage and output signals from the sensor 104, between the carriage circuit 500 and the sensor 104.

The carriage circuit 500 comprises a memory control circuit 501, a cartridge detection/short detection circuit 502, and a sensor driving circuit 503. The memory control circuit 501 is a circuit connected to the terminals 530, 560, 570, 580 of the carriage circuit 500 mentioned above, and used to control the memory 203 of the ink cartridge 100 to perform data read/write operations. The memory control circuit 501 and the memory 203 are low-voltage circuits driven at relatively low voltage (in the embodiment, a maximum of about 3.3 V). The memory control circuit 501 can employ a known design, and as such need not be described in detail here.

The sensor driving circuit 503 is a circuit connected to the terminals 590 and 550 of the carriage circuit 500, and used to control the driving voltage output from these terminals 590 and 550 to drive the sensor 104, causing the sensor 104 to detect the remaining ink level. As will be described later, the driving voltage has a generally trapezoidal shape, and contains relatively high voltage (in the embodiment, about 36 V). Specifically, the sensor driving circuit 503 and the sensor 104 are high-voltage circuits using relatively high voltage via the terminals 590 and 550. The sensor driving circuit 503 is composed of a logic circuit for example, but need not be described in detail herein.

The cartridge detection/short detection circuit 502, like the memory control circuit 501, is a low-voltage circuit driven using relatively low voltage (in the embodiment, a maximum of about 3.3V). As depicted in FIG. 8, the cartridge detection/short detection circuit 502 comprises a first detection circuit 5021 and a second detection circuit 5022. The first detection circuit 5021 is connected to the terminal 510 of the carriage circuit 500. The first detection circuit 5021 has a cartridge detection function for detecting whether there is contact between the terminal 510 and the first short detection terminal 210 of the board 200, and a short detection function for detecting shorting of the terminal 510 to the terminals 550 and 590 which output high voltage.

To describe in more specific terms, the first detection circuit 5021 has a reference voltage V_ref1 applied to one end of two series-connected resistors R2, R3, with the other end being grounded, thereby maintaining the potential at point P1 and P2 in FIG. 4 at V_ref1 and V_ref2, respectively. Herein V_ref1 shall be termed the short detection voltage, and V_ref2 shall be termed the cartridge detection voltage. In the embodiment, the short detection voltage V_ref1 is set to 6.5 V, and the cartridge detection voltage V_ref2 is set to 2.5 V. These values are established by means of the circuits, and are not limited to the values given herein.

As depicted in FIG. 8, the short detection voltage V_ref1 (6.5 V) is input to the negative input pin of a first Op-Amp OP1, while the cartridge detection voltage V_ref2 (2.5 V) is input to the negative input pin of a second Op-Amp OP2. The potential of the terminal 510 is input to the positive input pins of the first Op-Amp OP1 and the second Op-Amp OP2. These two Op-Amps function as a comparator, outputting a High signal when the potential input to the negative input pin is higher than the potential input to the positive input pin, and conversely outputting a Low signal when the potential input to the negative input pin is lower than the potential input to the positive input pin.

As depicted in FIG. 8, the terminal 510 is connected to a 3.3 V power supply VDD 3.3 via a transistor TR1. By means of this arrangement, if terminal 510 is free e.g. there is no contact with terminal 510, the potential of the terminal 510 will be set at about 3 V. As noted, when the ink cartridge 100 is attached, the terminal 510 comes into contact with the first short detection terminal 210 of the board 200 described previously. Here, as depicted in FIG. 7, with the first short detection terminal 210 and the ground terminal 220 electrically connected (shorted) in the board 200, when the terminal 510 comes into contact with the first short detection terminal 210 (herein referred to as being in contact), the terminal 510 is electrically continuous with the grounded terminal 520, and the potential of the terminal 510 drops to 0 V.

Consequently, with the terminal 510 free, a High signal from the second Op-Amp OP2 is output as the cartridge detection signal CS1. With the terminal 510 in contact, a Low signal from the second Op-Amp OP2 is output as the cartridge detection signal CS1.

On the other hand, if the terminal 510 is shorted to the adjacent terminal 550, there are instances in which the sensor driving voltage (45 V max) will be applied to the terminal 510. As shown in FIG. 8, when voltage greater than the short detection voltage V_ref1 (6.5 V) is applied to the terminal 510 due to shorting, a High signal from the Op-Amp OP1 will be output to an AND circuit AA.

As shown in FIG. 8, a short detection enable signal EN is input from the main control circuit 40 to the other input pin of the AND circuit AA. As a result, only during the time interval that a High signal is input as the short detection enable signal EN, the first detection circuit 5021 outputs the High signal from the Op-Amp OP1 as a short detection signal AB1. That is, execution of the short detection function of the first detection circuit 5021 is controlled by means of the short detection enable signal EN of the main control circuit 40. The short detection signal AB1 from the AND circuit AA is output to the main control circuit 40, as well as being output to the base pin of the transistor TR1 via resistance R1. As a result, by means of the transistor TR1 it is possible to prevent high voltage from being applied to the power supply VDD 3.3 via the terminal 510 when a short is detected (when the short detection signal AB1 is HI).

The second detection circuit 5022 has a cartridge detection function for detecting whether there is contact between the terminal 540 and the second short detection terminal 240 of the board 200, and a short detection function for detecting shorting of the terminal 540 to the terminals 550 and 590 which output high voltage. Since the second detection circuit 5022 has the same arrangement as the first detection circuit 5021, a detailed illustration and description need not be provided here. Hereinafter, the cartridge detection signal output by the second detection circuit 5022 shall be denoted as CS2, and the short detection signal as AB2.

An arrangement of the carriage circuit 500 corresponding to a single ink cartridge 100 has been described above. In the embodiment, since four ink cartridges 100 are attached, four of the cartridge detection/short detection circuits 502 described above will be provided, at each of the attachment locations for the four ink cartridges 100. While only a single sensor driving circuit 503 is provided, and a single sensor driving circuit 503 is connectable to each of the sensors 104 of the ink cartridges 100 attached at the four attachment locations by means of a switch (not shown). The memory control circuit 501 is a single circuit responsible for processes relating to the four ink cartridges.

The main control circuit 40 is a computer of known design comprising a central processing unit (CPU), a read-only memory (ROM), and a random access memory (RAM). As noted, the main control circuit 40 controls the entire printer; in FIG. 8, however, only those elements necessary for description of the embodiment are selectively illustrated, and the following description refers to the illustrated arrangement. The main control circuit 40 comprises a cartridge determining module M50 and a remaining ink level determining module M60. On the basis of the received cartridge detection signals CS1, CS2, the cartridge determining module M50 executes a cartridge determination process, described later. The remaining ink level determining module M60 controls the sensor driving circuit 503, and executes a remaining ink level detection process, described later.

Figure 9:
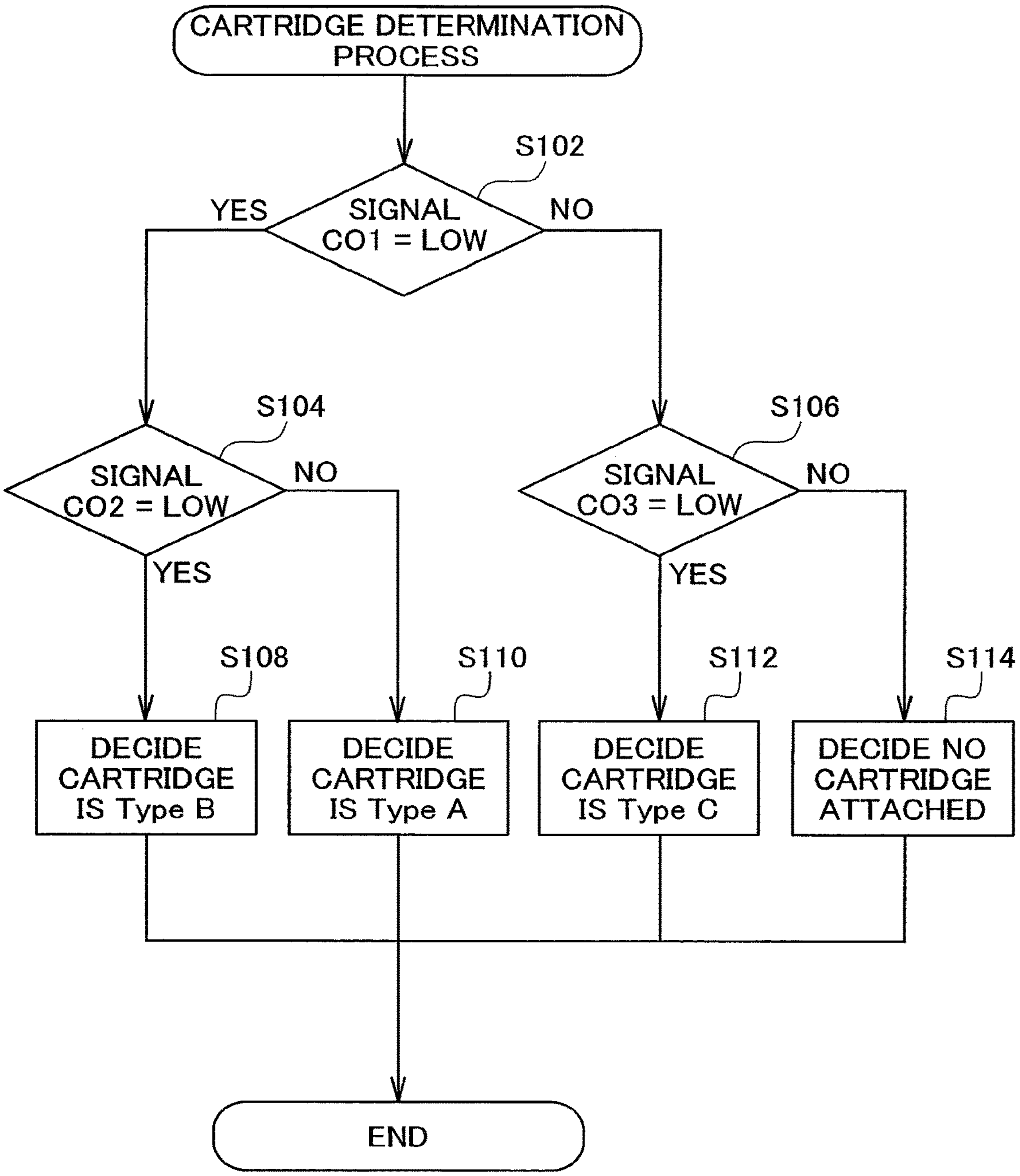
FIG. 9 shows a flowchart depicting the processing routine of the cartridge determination process.
Figure 10C:
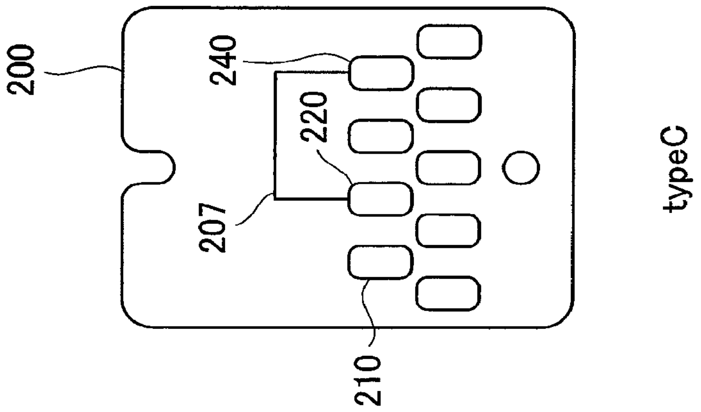
FIGS. 10A-C show illustrations depicting three types of terminal lines on the board.
Figure 10B:
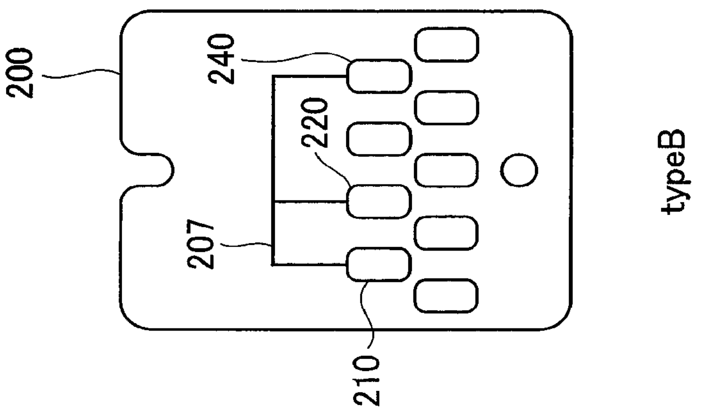
Figure 10A:
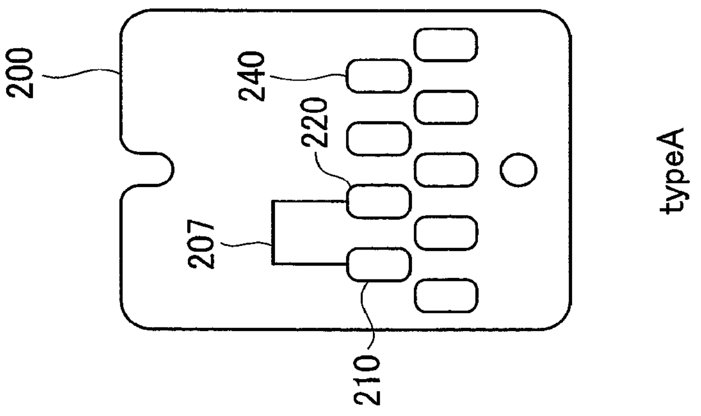

Cartridge Determination Process:

The cartridge determination process executed by the cartridge determining module M50 of the main control circuit 40 will be described with reference to FIG. 9 and FIG. 10. FIG. 9 shows a flowchart depicting the processing routine of the cartridge determination process. FIGS. 10A-C show illustrations depicting three types of terminal lines on the board 200.

Before turning to the cartridge determination process, the board 200 will be described further with reference to FIG. 10. The board 200 mentioned previously comes in three types, depending on the wiring pattern of the first short detection terminal 210, the second short detection terminal 240, and the ground terminal 220. These three types are designated respectively as Type A, Type B, and Type C. As depicted in FIG. 10A, the Type A board 200 is arranged with the first short detection terminal 210 and the ground terminal 220 electrically connected by a conducting line 207, while the second short detection terminal 240 and the ground terminal 220 are not electrically connected. As depicted in FIG. 10B, the Type B board 200 is arranged with both the first short detection terminal 210 and the second short detection terminal 240 electrically connected with the ground terminal 220 by a conducting line 207. As depicted in FIG. 10C, the Type C board 200 is arranged with the second short detection terminal 240 and the ground terminal 220 electrically connected by a conducting line 207, while the first short detection terminal 210 and the ground terminal 220 are not electrically connected. A board 200 of predetermined type, selected with reference to ink type or ink quantity for example, is disposed on the ink cartridge 100. Specifically, depending on the quantity of ink contained in the ink cartridge 100, a Type A board 200 could be disposed on an L size cartridge containing a large quantity of ink; a Type B board 200 could be disposed on an M size cartridge containing a standard quantity of ink; and a Type C board 200 could be disposed on an S size cartridge containing a small quantity of ink.

The cartridge determining module M50 of the main control circuit 40 constantly receives from the cartridge detection/short detection circuit 502 the cartridge detection signals CS1, CS2 for each of the four attachment locations of the holder 4, and using these signals executes the cartridge determination process for each of the attachment locations.

When the cartridge determining module M50 initiates the cartridge determination process for a selected attachment location, the cartridge determining module M50 first ascertains whether the cartridge detection signal CS1 from the cartridge detection/short detection circuit 502 in the selected attachment location is a Low signal (Step S102). Next, the cartridge determining module M50 ascertains whether the cartridge detection signal CS2 in the selected attachment location is a Low signal (Step S104 or S106). If as a result the cartridge detection signals CS1 and CS2 are both Low signals (Step S102: YES and Step S104: YES), the cartridge determining module M50 decides that the ink cartridge 100 attached to the selected attachment location is furnished with the Type B board 200 (Step S108).

Similarly, the cartridge determining module M50, in the event that the cartridge detection signal CS1 is a Low signal and the cartridge detection signal CS2 is a High signal (Step S102: YES and Step S104: NO), decides that the ink cartridge is furnished with the Type A board 200 (Step S110); or in the event that the cartridge detection signal CS1 is a High signal and the cartridge detection signal CS2 is a Low signal (Step S102: NO and Step S104: YES), decides that the ink cartridge is furnished with the Type C board 200 described above (Step S112).

In the event that both the cartridge detection signals CS1 and CS2 are High signals Step S102: NO and Step S104: NO), the cartridge determining module M50 decides that no cartridge is attached to the selected attachment location (Step S114). In this way, the cartridge determining module M50 determines whether an ink cartridge 100 is attached, and if so what type, for each of the four attachment locations.

Figure 11:
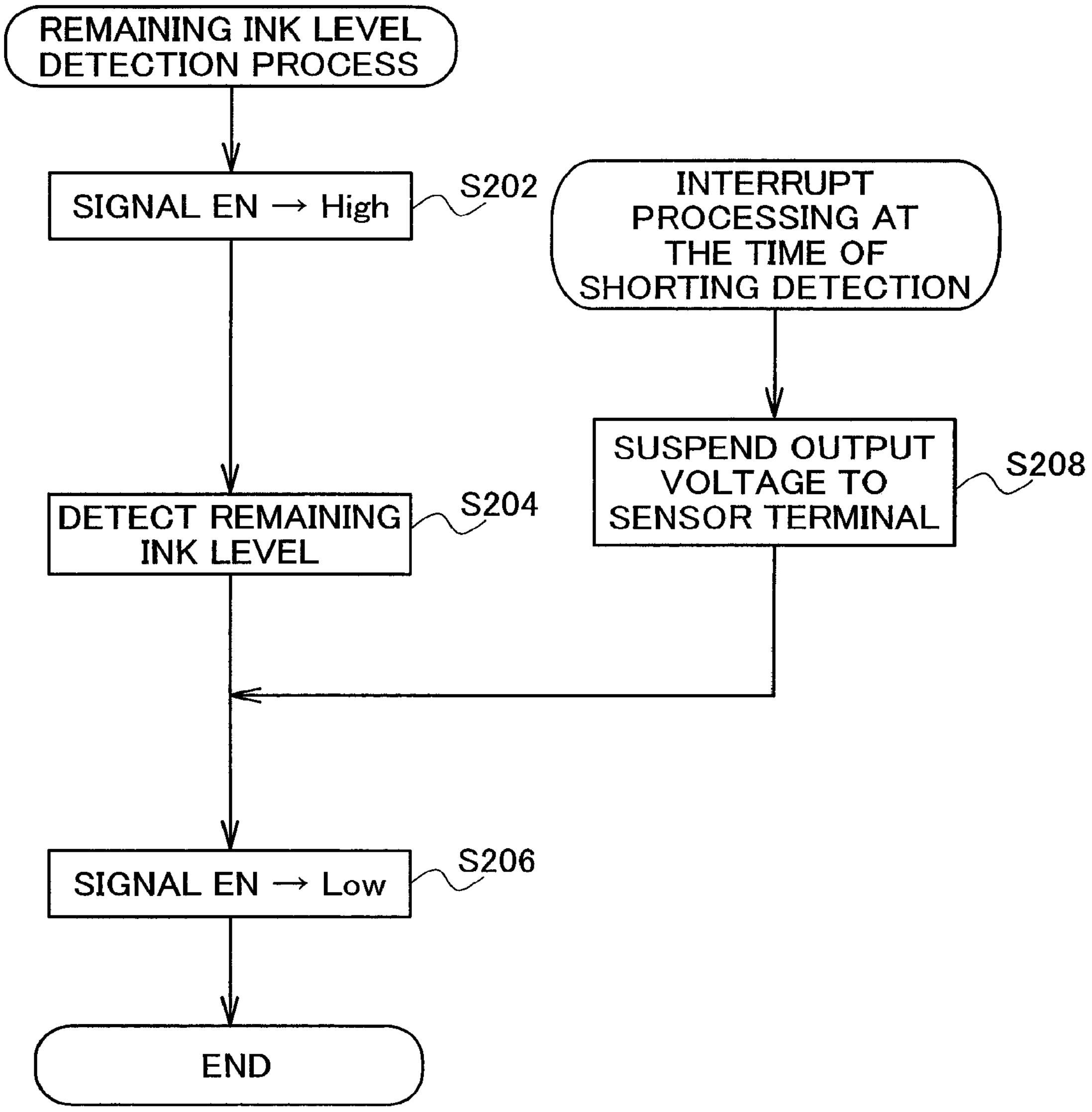
FIG. 11 shows a flowchart depicting the processing routine of the remaining ink level detection process.
Figures 12A, 12B, 12C:
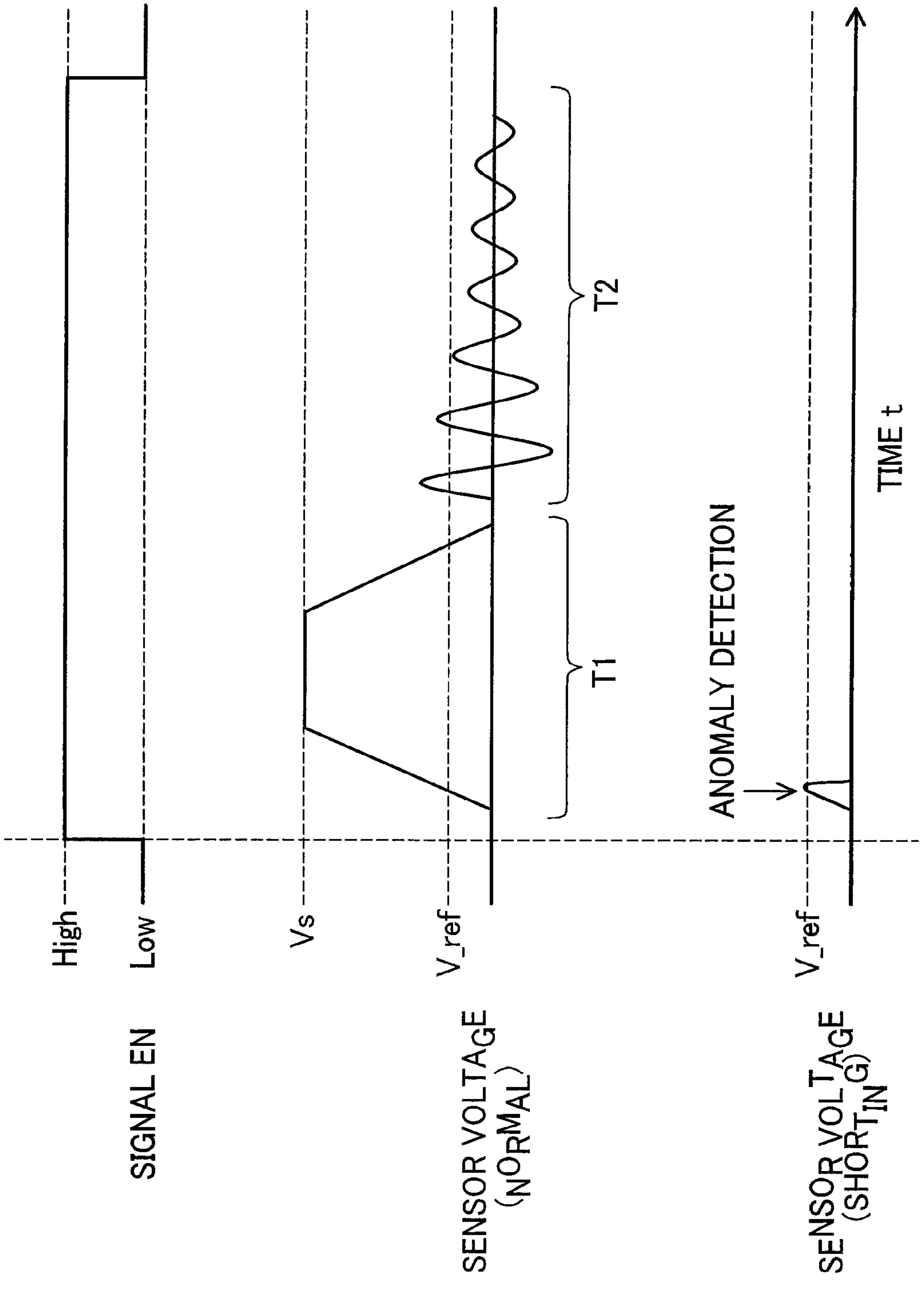
FIGS. 12A-C show timing charts depicting temporal change in the shorting-detection enable signal and sensor voltage during execution of the remaining ink level detection process.

Remaining Ink Level Detection Process:

The remaining ink level detection process executed by the remaining ink level determining module M60 of the main control circuit 40 will now be described with reference to FIG. 11 and FIGS. 12A-C. FIG. 11 shows a flowchart depicting the processing routine of the remaining ink level detection process. FIGS. 12A-C show timing charts depicting temporal change in the shorting-detection enable signal and sensor voltage during execution of the remaining ink level detection process; The remaining ink level determining module M60 of the main control circuit 40, in the event that the remaining ink level in the ink cartridge 100 attached at any of the attachment locations of the holder 4 is to be detected, first sets to High the short detection enable signal EN to all of the cartridge detection/short detection circuits 502 (Step S202). As a result, the short detection function is enabled in all of the cartridge detection/short detection circuits 502, and if voltage above the reference voltage V_ref1 (6.5 V) is applied to the aforementioned terminal 520 and terminal 540, are able to output High signals as the short detection signals AB1, AB2. In other words, a state in which the short detection enable signal EN are High signals is a state in which shorting of the terminal 510 or terminal 540 to the terminal 550 or terminal 590 is monitored.

Next, the remaining ink level determining module M60 instructs the sensor driving circuit 503 to output driving voltage from the terminal 550 or terminal 590 to the sensor 104, and detect the remaining ink level output (Step S204). To describe in more specific terms, when the sensor driving circuit 503 receives an instruction signal from the remaining ink level determining module M60, the sensor driving circuit 503 outputs driving voltage from either the terminal 550 or the terminal 590, the voltage being applied to the piezoelectric element which constitutes the sensor 104 of the ink cartridge 100, charging the piezoelectric element and causing it to distort by means of the inverse piezoelectric effect. The sensor driving circuit 503 subsequently drops the applied voltage, whereupon the charge built up in the piezoelectric element is discharged, causing the piezoelectric element to vibrate. In FIG. 12, the driving voltage is the voltage shown during time interval T1. As depicted in FIG. 12, the driving voltage fluctuates between the reference voltage and the maximum voltage Vs in such a way as to describe a trapezoidal shape. The maximum voltage Vs is set to relatively high voltage (e.g. about 36 V). Via the terminal 550 of the terminal 590, the sensor driving circuit 503 detects the voltage produced by the piezoelectric effect as a result of vibration of the piezoelectric element (in FIG. 12 depicted as the voltage during time interval T2), and by measuring the vibration frequency thereof detects the remaining ink level. Specifically, this vibration frequency represents the characteristic frequency of the surrounding structures (the housing 101 and ink) that vibrate together with the piezoelectric element, and changes depending on the amount of ink remaining within the ink cartridge 100, so the remaining ink level can be detected by measuring this vibration frequency. The sensor driving circuit 503 outputs the detected result to the remaining ink level determining module M60 of the main control circuit 40.

When the remaining ink level determining module M60 receives the detected result from the sensor driving circuit 503, the remaining ink level determining module M60 brings the short detection enable signal EN, which was previously set to a High signal in Step S202, back to a Low signal (Step S206), and terminates the process. In this process, the interval that the remaining ink level is being detected is a state in which the short detection enable signal EN is set to a High signal to enable short detection. In other words, remaining ink level is detected while the occurrence of shorting is being monitored by the cartridge detection/short detection circuit 502.

Process when Shorting is Detected

The process carried out in the event that, during execution of detection of the remaining ink level (Step S204), the remaining ink level determining module M60 receives a High signal as the short detection signal AB1 or AB2, e.g. shorting is detected shall be described here. In FIG. 11, a flowchart of the interrupt processing routine when shorting is detected is shown as well. When the terminal 510 or the terminal 540 shorts to the terminal that is outputting the sensor driving voltage of the terminals 550 and 590, the sensor driving voltage will be applied to the shorting terminal 510 or terminal 540. Thereupon, since the short detection enable signal EN is currently set to High, at the instant that the sensor driving voltage goes above the short detection voltage V_ref1 (6.5 V), a High signal will be output as the short detection signals AB1, AB2 from the cartridge detection/short detection circuit 502. When the remaining ink level determining module M60 receives either of these short detection signals AB1, AB2, the remaining ink level determining module M60 suspends detection of remaining ink level, and executes the interrupt processing when shorting is detected.

When the interrupt processing is initiated, the remaining ink level determining module M60 immediately instructs the sensor driving circuit 503 to suspend the output of sensor driving voltage (Step S208).

Next, the remaining ink level determining module M60, without carrying out remaining ink level detection process to its conclusion, brings the short detection enable signal EN back to a Low signal (Step S206) to terminate the process. For example, the main control circuit 40 may take some countermeasure, such as notifying the user of the shorting.

FIG. 12A depicts change of the detection enable signal EN through time. FIG. 12B depicts sensor voltage in the event that neither the terminal 510 nor the terminal 540 is shorting to the terminal that outputs the sensor driving voltage of the terminals 550 and 590, so that the remaining ink level detection process is being executed normally. FIG. 12C depicts sensor voltage in the event that the terminal 510 or the terminal 540 is shorting to the terminal that, of the terminals 550 and 590, outputs the sensor driving voltage.

As depicted in FIG. 12A, during execution of the remaining ink level detection process, the detection enable signal EN is a High signal. As shown in FIG. 12B, in the normal state (no shorting), after high voltage Vs has been applied to the sensor 104, the applied voltage drops, and subsequently vibration voltage is produced through the piezoelectric effect. In the embodiment, Vs is set at 36 V.

As depicted in FIG. 12C, on the other hand, in the abnormal state (shorting), the sensor voltage drops at the instant that it goes above the short detection voltage V_ref1 (6.5 V). This is due to the fact that, at the instant that the sensor voltage goes above the short detection voltage V_ref1 (6.5 V), a High signal is output as the short detection signal AB1 or AB2 from the cartridge detection/short detection circuit 502 to the remaining ink level determining module M60, and the remaining ink level determining module M60 receiving this signal immediately drops the sensor driving voltage.

Figure 13:
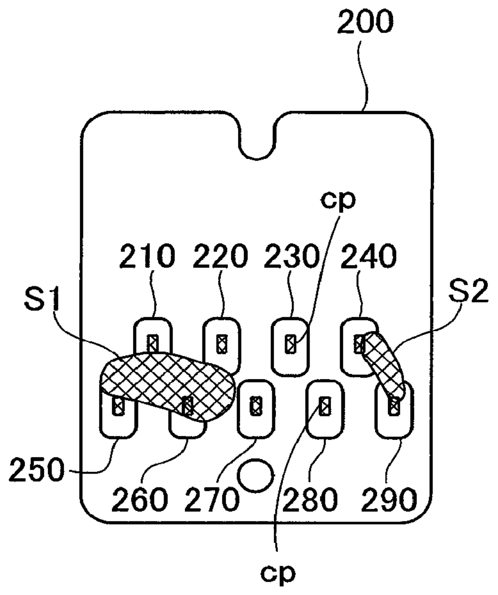
FIG. 13 shows an illustration of a scenario of shorting.

FIG. 13 shows an illustration of a scenario of shorting. Here, the likely scenario for shorting to other terminals by the terminals 550 and 590 which output the sensor driving voltage is, for example, the case depicted in FIG. 13, in which an electrically conductive ink drop S1 or a water drop S2 formed by condensation has become deposited on the board 200 of the ink cartridge 100, bridging the gap between the first sensor drive terminal 250 or the second sensor drive terminal 290 and another terminal or terminals on the board 200, producing shorting. For example, ink drop S1 that has adhered to the surface of the carriage 3 or ink supply needle 6 disperses and adheres as shown in FIG. 13 by the motion of attaching or detaching of ink cartridge 100. In this instance, when the ink cartridge 100 is attached, the terminal 550 that outputs the sensor driving voltage, for example, will short to another terminal 510, 520, or 560 of the carriage circuit 500 via the first sensor drive terminal 250 and the terminals (FIG. 13: terminals 210, 220, 260) bridged by the ink drop S1 to the sensor drive terminal 250. Or, the terminal 590 that outputs the sensor driving voltage will short to another terminal 540 of the carriage circuit 500 via the second sensor drive terminal 290 and the second short detection terminal 240 (FIG. 13) bridged by the water drop S2 to the second sensor drive terminal 290, for example. Such a shorting is caused by various factor as well as the adhesion of the ink drop. For example, the shorting may be caused by trapping electrically conducting object, for example, paper clip on carriage 3. The shorting also may be caused by adhesion to terminals of the electrically conducting material, for example, skin oil of user.

As mentioned previously with reference to FIG. 3, in the ink cartridge 100 pertaining to the embodiment the first sensor drive terminal 250 and the second sensor drive terminal 290 which apply the driving voltage to the sensor are arranged at the two ends of the terminal group, so the number of adjacent terminals is small. As a result, the likelihood of the first sensor drive terminal 250 and the second sensor drive terminal 290 shorting to other terminals is low.

On the board 200, if the first sensor drive terminal 250 should short to the adjacent first short detection terminal 210, the shorting will be detected by the aforementioned cartridge detection/short detection circuit 502. For example, shorting of the first sensor drive terminal 250 to another terminal caused by the ink drop S1 infiltrating from the first sensor drive terminal 250 side will be detected instantly and the output of sensor driving voltage will be suspend, preventing or reducing damage to the memory 203 and the printing apparatus 1000 circuits (the memory control circuit 501 and the cartridge detection/short detection circuit 502) caused by the shorting.

Also, the first short detection terminal 210 is adjacent to the first sensor drive terminal 250 and situated closest to the first sensor drive terminal 250. Consequently, in the event that the first sensor drive terminal 250 should short to another terminal or terminals due to the ink drop S1 or the water drop S2, there is a high likelihood that the first sensor drive terminal 250 will short to the first short detection terminal 210 as well. Consequently, shorting of the first sensor drive terminal 250 to another terminal can be detected more reliably.

In addition to detecting shorting, the first short detection terminal 210 is also used by the cartridge detection/short detection circuit 502 to determine whether an ink cartridge 100 is attached, as well as to determine the type of attached ink cartridge 100. As a result, the number of terminals on the board 200 can be kept down, and it becomes possible to reduce the number of board 200 manufacturing steps and the number of parts for the board 200.

Similarly, if the second sensor drive terminal 290 should short to the second short detection terminal 240, the short will be detected by the cartridge detection/short detection circuit 502. Consequently, shorting of the second sensor drive terminal 290 to another terminal caused by the ink drop S1 or the water drop S2 infiltrating from the second sensor drive terminal 290 side can be detected instantly. As a result, damage to the circuits of the memory 203 and the printing apparatus 1000 caused by shorting can be prevented or reduced. Similarly, the second short detection terminal 240 is the terminal situated closest to the second sensor drive terminal 290. Consequently, in the event that the second sensor drive terminal 290 should short to another terminal or terminals due to the ink drop S1 or the water drop S2, there is a high likelihood that the second sensor drive terminal 290 will short to the second short detection terminal 240 as well. Consequently, shorting of the second sensor drive terminal 290 to another terminal can be detected more reliably.

The first sensor drive terminal 250 and the first short detection terminal 210 on the one hand, and the second sensor drive terminal 290 and the second short detection terminal 240 on the other, are situated at the ends of the terminal group so that the other terminals (220, 230, 260-270) lie between them.

Consequently, if foreign matter (the ink drop S1, water drop S2 etc.) should infiltrate from either side as indicated by the arrows in FIG. 13, this infiltration can be detected before it infiltrates as far as the other terminals (220, 230, 260-270). Consequently, damage to the circuits of the memory 203 and the printing apparatus 1000 due to infiltration of foreign matter can be prevented or reduced.

The first sensor drive terminal 250 and the second sensor drive terminal 290 are arranged in the row on the insertion direction R side (lower row). As a result, since the terminals 250, 290 to which sensor driving voltage including high voltage is applied are situated to the back in the insertion direction, there is less likelihood that ink drops or foreign matter (e.g. a paperclip) will infiltrate to the location of these terminals 250, 290. As a result, damage to the circuits of the memory 203 and the printing apparatus 1000 caused by infiltration of foreign matter can be prevented or reduced.

The terminal group of the board 200 is arranged in a staggered pattern. As a result, unwanted contact of the terminals of the ink cartridge 100 with the terminals of the printing apparatus 1000 (the contact forming members 403, 404 mentioned previously) during the attachment operation can be prevented or reduced.

B. Variations

Figure 15A:
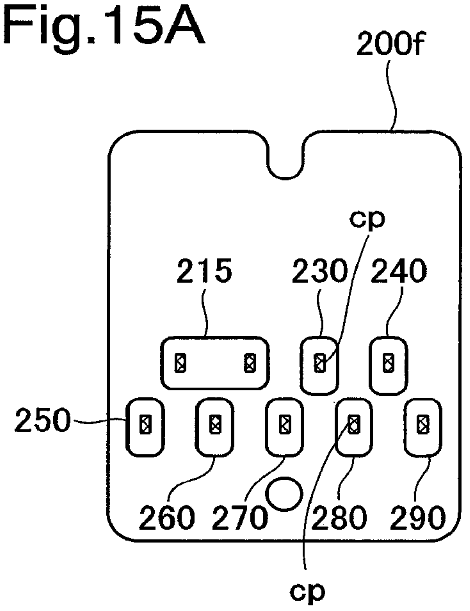
FIGS. 15A-C show second diagrams depicting boards pertaining to variations.
Figure 15B:
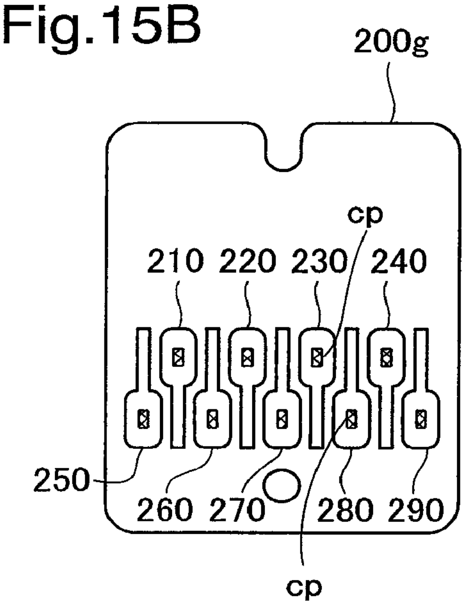
Figure 15C:
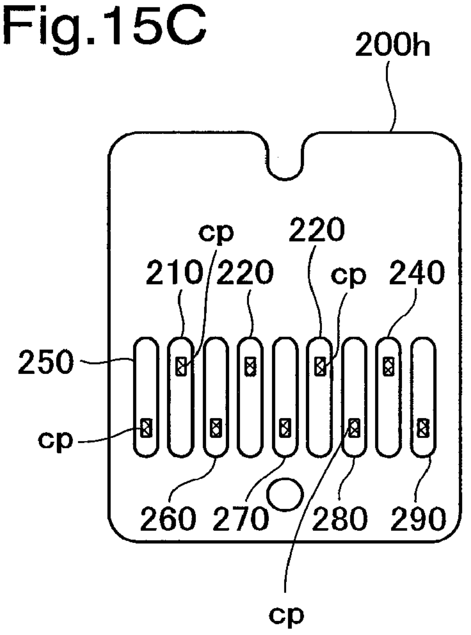
Figure 16A:
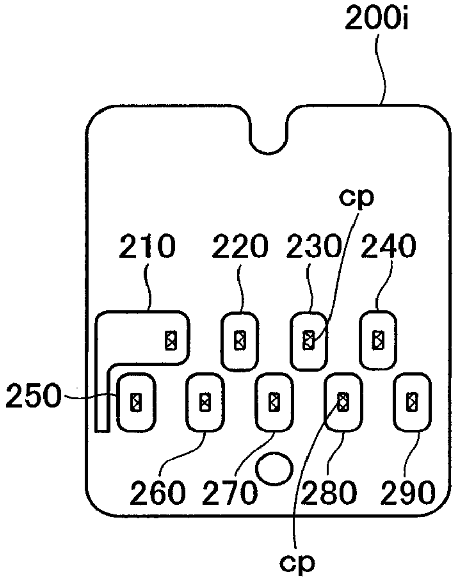
FIGS. 16A-D show third diagrams depicting boards pertaining to variations.
Figure 16B:
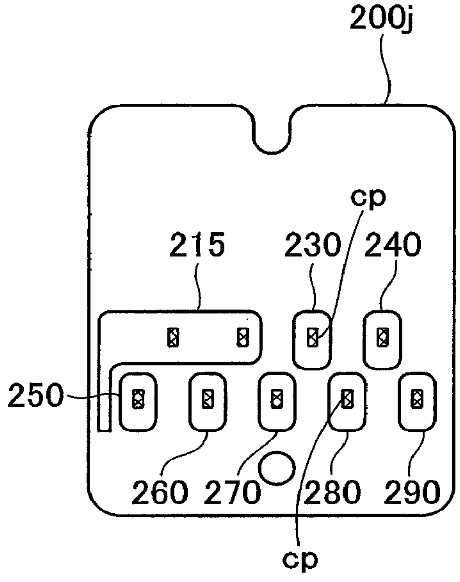

Variations of the board 200 mounted to the ink cartridge 100 shall be described with reference to FIGS. 14A-16B. FIGS. 14A-D show first diagrams depicting boards pertaining to variations. FIGS. 15A-C show second diagrams depicting boards pertaining to variations. FIGS. 16A-B show third diagrams depicting boards pertaining to variations.

Figure 14A:
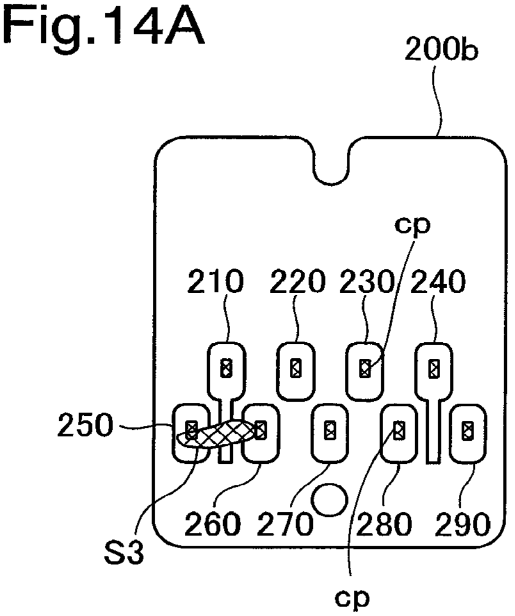
FIGS. 14A-D show first diagrams depicting boards pertaining to variations.

Variation 1:

On the board 200*b* depicted in FIG. 14A, the first short detection terminal 210 is similar to the first short detection terminal 210 of the board 200 of the embodiment, but has at its lower end an extended portion that reaches into proximity with the lower edge of the lower row. The extended portion is positioned between the first sensor drive terminal 250 and the reset terminal 260 of the lower row. As a result, for example, even in the event of adhesion of an ink drop S3 as depicted in FIG. 14 (*a*), shorting of the extended portion of the short detection terminal 210 to the first sensor drive terminal 250 will be detected. Like this, when the first sensor drive terminal 250 and terminal other than the first short detection terminal 210 are shorting, there is a high possibility that the first sensor drive terminal 250 and the first short detection terminal 210 are shorting and the sensor driving voltage is suspended. Accordingly, problems caused by shorting of the first sensor drive terminal 250 to another terminal (in the example of FIG. 14A, the reset terminal 260) can be prevented or reduced.

As shown in FIG. 14A, the second short detection terminal 240 of the board 200*b* is also similar in shape to the first short detection terminal 210 mentioned above, and shorting of the second sensor drive terminal 290 to another terminal will also be detected more reliably.

Figure 14B:
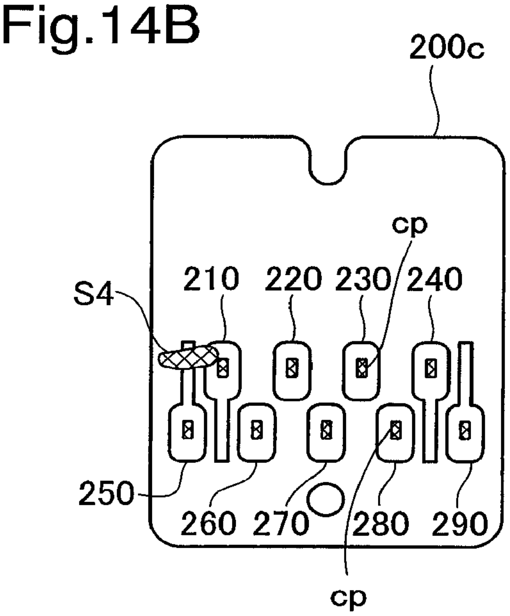

Variation 2:

The board 200*c* depicted in FIG. 14B has, in addition to the arrangement of the board 200*b* described above, also has an extended portion located at the upper side of the first sensor drive terminal 250, and reaching into proximity with the upper edge of the upper row. As a result, even in the event of adhesion of an ink drop S4 as depicted in FIG. 14 (*b*), shorting of the short detection terminal 210 to the extended portion of the first sensor drive terminal 250 will be detected. Like this, when the first sensor drive terminal 250 and terminal other than the first short detection terminal 210 are shorting, there is a high possibility that the first sensor drive terminal 250 and the first short detection terminal 210 are shorting and the sensor driving voltage is suspended. Accordingly, problems caused by shorting of the first sensor drive terminal 250 to another terminal can be prevented or reduced.

As shown in FIG. 14B, the second sensor drive terminal 290 of the board 200*c* is also similar in shape to the first sensor drive terminal 250 mentioned above, and infiltration of an ink drop from the end, at the end at which the second sensor drive terminal 290 is situated, can be detected instantly.

Figure 14C:
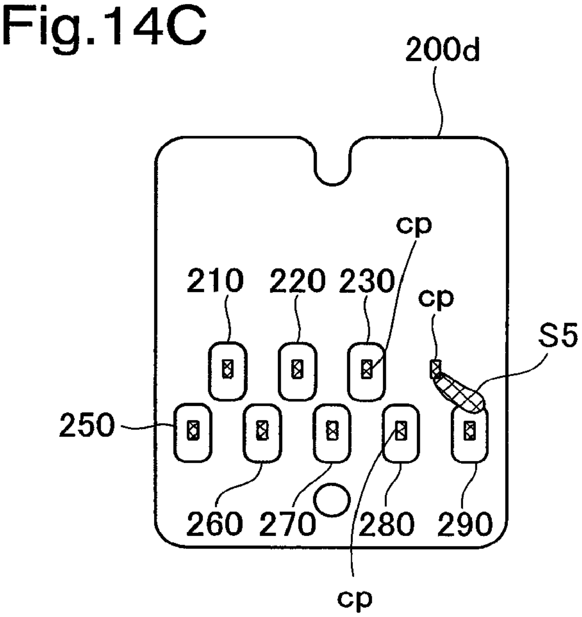

Variation 3:

The board 200*d* depicted in FIG. 14C differs from the board 200 of the embodiment in that there is no second short detection terminal 240. In the case of the Type A board 200 depicted in FIG. 10A, the second short detection terminal 240 does not carry out detection of contact by means of the cartridge detection/short detection circuit 502 (since there is no shorting to the ground terminal 220). Consequently, in the case of the Type A board 200, the second short detection terminal 240 is used for short detection only and accordingly can be dispensed with. In this case as well, since the first short detection terminal 210 is at the location closest to the first sensor drive terminal 250, when the first sensor drive terminal 250 and terminal other than the first short detection terminal 210 are shorting, there is a high possibility that the first sensor drive terminal 250 and the first short detection terminal 210 are shorting and the sensor driving voltage is suspended. Infiltration of an ink drop to second sensor drive terminal 290 side will also be detected to a certain extent. In FIG. 14C, the symbol CP represents the location of contact with the contact forming member 403 that would contact the second short detection terminal 240 if the second short detection terminal 240 were present (i.e. the contact forming member 403 corresponding to the terminal 540 of the carriage circuit 500). Even in the case that the second short detection terminal 240 is absent, if a shorting should occur between the second sensor drive terminal 290 and the contact forming member 403 corresponding to the terminal 540 of the carriage circuit 500 due to an ink drop S5, infiltration of the ink drop S5 will be detected. Similarly, in the case of a Type C board 200, the first short detection terminal 210 may be dispensed with.

Figure 14D:
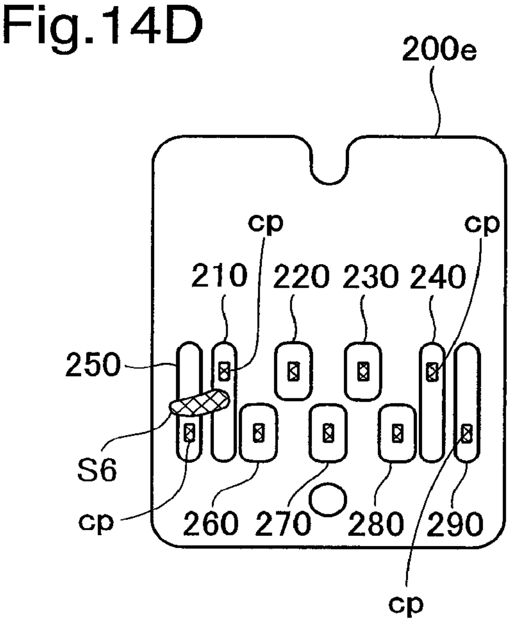

Variation 4:

On the board 200*e* depicted in FIG. 14D, the first sensor drive terminal 250 and the first short detection terminal 210 have elongated shape reaching from the vicinity of the upper edge of the upper row to the vicinity of the lower edge of the lower row. The terminals of this shape, as the contact locations are indicated by the symbol CP in FIG. 14D, can contact the corresponding contact forming portions 403 arranged in a staggered pattern. In the case of the board 200*e*, like the board 200*c* described previously, even if an ink drop S6 should become deposited for example, shorting between the extended portions of the first short detection terminal 210 and the first sensor drive terminal 250 will be detected. Like this, first short detection terminal 210 is located between first sensor drive terminal 250 and terminal other than the first short detection terminal 210. Accordingly, when the first sensor drive terminal 250 and terminal other than the first short detection terminal 210 are shorting, there is a high possibility that the first sensor drive terminal 250 and the first short detection terminal 210 are shorting and the sensor driving voltage is suspended.

The second sensor drive terminal 290 and the second short detection terminal 240 of the board 200*e* have shape similar to the first sensor drive terminal 250 and the first short detection terminal 210 described above. Accordingly, when the second sensor drive terminal 290 and terminal other than the second short detection terminal 240 are shorting, there is a high possibility that the second sensor drive terminal 290 and the second short detection terminal 240 are shorting. As a result, the possibility preventing or reducing the problems caused by shorting of the sensor drive terminal 250, 290 to another terminal becomes higher.

Variation 5:

On the board 200*f* depicted in FIG. 15A, the terminal which corresponds to the first short detection terminal 210 and the ground terminal 220 in the board 200 pertaining to the embodiment is an integral terminal 215 wherein these two terminals are integrally formed as a single member. This board 200*f* can be used in place of the Type A or Type B board 200 (FIG. 10) whose first short detection terminal 210 and ground terminal 220 are shorted. With the board 200*f*, the need is obviated for a line between the first short detection terminal 210 and the ground terminal 220, which was required in the case of in the board 200 pertaining to the embodiment, so the board 200 requires fewer process steps and fewer parts.

Variation 6:

On the board 200*g* depicted in FIG. 15B, the terminals 210-240 of the upper row each have shape similar to the first short detection terminal 210 of the board 200*b* described previously. Specifically, each of the terminals 210-240 has an extended portion situated at the lower edge of the corresponding terminal of the board 200 pertaining to the embodiment and reaching into proximity with the lower edge of the lower row. The terminals 250-290 of the lower row of the board 200*g* are similar in shape to the first sensor drive terminal 250 of the board 200*c* described earlier. Specifically, the each of the terminals 250-290 has an extended portion situated at the upper edge of the corresponding terminal of the board 200 pertaining to the embodiment and reaching into proximity with the upper edge of the upper row.

As a result, the terminals 210-290 of the board 200*g* are arranged so as to form a terminal group composed of a single row of terminals of generally oar shape of in mutually different arrangement, rather than being arranged in two rows. The first sensor drive terminal 250 and the second sensor drive terminal 290 to which the high-voltage sensor driving voltage is applied are positioned at the two ends of the single row of the terminal group, with the first short detection terminal 210 and the second short detection terminal 240 respectively arranged adjacently inward from the first sensor drive terminal 250 and the second sensor drive terminal 290.

With the board 200*g*, an ink drop or foreign matter infiltrating from either end can be detected immediately at the point in time that shorting occurs between the first sensor drive terminal 250 and the short detection terminal 210, or between the second sensor drive terminal 290 and the second short detection terminal 240. In the event that the first sensor drive terminal 250 or the second sensor drive terminal 290 should short to another terminal, in the case where the shorting is due to an ink drop or the like, the likelihood is extremely high that shorting between the first sensor drive terminal 250 and the short detection terminal 210, or between the second sensor drive terminal 290 and the second short detection terminal 240, will occur at the same time. Consequently, shorting of the first sensor drive terminal 250 or the second sensor drive terminal 290 to another terminal can be detected reliably. As a result, damage to the memory 203 and the printing apparatus 1000 circuits (the memory control circuit 501 and the cartridge detection/short detection circuit 502) caused by the shorting can be prevented or minimized.

Variation 7:

On the board 200*h* depicted in FIG. 15C, the terminals 210-290 have elongated shape extending over a distance equivalent to two rows of the board 200 pertaining to the embodiment, in a manner similar to the first sensor drive terminal 250 and the first short detection terminal 210 of the board 200*e* described previously. The terminals of this shape, as the contact locations are indicated by the symbol cp in FIG. 15C, can contact the corresponding contact forming portions 403 arranged in a staggered pattern.

In the board 200*h*, the terminals 210-290 are arranged so as to form a single row in the orthogonal direction to the insertion direction R, in a manner similar to the board 200*g* described above. Also, like the board 200*g*, the first sensor drive terminal 250 and the second sensor drive terminal 290 to which the high-voltage sensor driving voltage is applied are positioned at the two ends of the single row of terminals, with the first short detection terminal 210 and the second short detection terminal 240 respectively arranged adjacently inward from the first sensor drive terminal 250 and the second sensor drive terminal 290. As a result, the board 200*h* affords advantages analogous to those of the board 200*g* described above.

Variation 8:

The first short detection terminal 210 of the board 200*i* depicted in FIG. 16A has a shape that is longer on the left side in the drawing, as compared to the first short detection terminal 210 of the board 200 pertaining to the embodiment. Additionally, the first short detection terminal 210 of the board 200*i* has an extended portion reaching from the left edge portion to the vicinity of the lower edge of the lower row. The extended portion is situated to the left of the first sensor drive terminal 250 in the lower row. In other words, the extended portion is disposed to further from the middle of the terminal group in a direction substantially orthogonal to the insertion direction R than the first sensor drive terminal 250. In this case, whereas viewed in terms of the terminal as a whole, the first short detection terminal 210 is situated outwardly (to the left side) of the first sensor drive terminal 250, when viewed in terms of the contact portion CP of the terminal, of the contact portions CP of all of the terminals 210-290 the contact portion CP of the first sensor drive terminal 250 is the one situated at the outermost position (left side), in the same manner as in the embodiment. Also, shorting between the first sensor drive terminal 250 and the first short detection terminal 210 that includes the contact portion CP adjacent to the contact portion CP of the first sensor drive terminal 250 is detected. Accordingly, the board 200*i* pertaining to this variation affords advantages similar to the board 200 pertaining to the embodiment. Specifically, infiltration of an ink drop from the edge can be detected instantly, and damage to the circuits of the memory 203 and the printing apparatus 1000 can be prevented or minimized. Additionally, since the first short detection terminal 210 has the extended portion, the length of a first portion that is a portion adjacent to the circumferential edge of the first short detection terminal 210 among the circumferential edge of the first sensor drive terminal 250 becomes long. As shown in FIG. 16B, the length of the first portion is longer than that of a second portion that is a portion adjacent to the circumferential edge of the reset terminal 260 among the among the circumferential edge of the first sensor drive terminal 250. As a result, when the first sensor drive terminal 250 and terminal other than the first short detection terminal 210, for example, the reset terminal 260 are shorting, there is a high possibility that the first sensor drive terminal 250 and the first short detection terminal 210 are shorting. Accordingly, the sensor driving voltage is suspended and problems caused by shorting of the first sensor drive terminal 250 to another terminal can be prevented or reduced with higher probability.

Figure 16C:
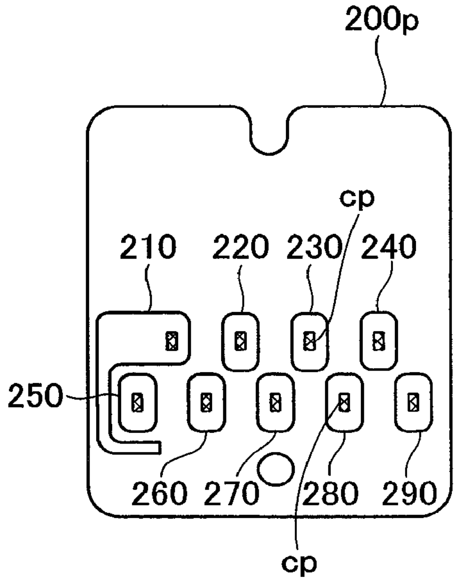

The first short detection terminal 210 of the board 200*p* in FIG. 16C has the longer extended portion than the first short detection terminal 210 of the board 200*i*. As shown in FIG. 16C, the extended portion of the first short detection terminal 210 of the board 200*p* extends from upper left to lower right of the first sensor drive terminal 250 along the circumferential edge of the first sensor drive terminal 250. As a result, the length of the first portion in the board 200*p* is longer than that in the board 200*i*. Accordingly, when the first sensor drive terminal 250 and terminal other than the first short detection terminal 210 are shorting, there is a higher possibility the sensor driving voltage is suspended and problems caused by shorting of the first sensor drive terminal 250 to another terminal can be prevented or reduced.

Figure 16D:
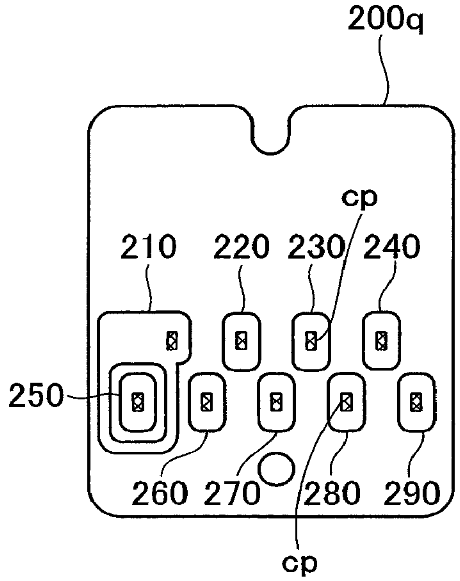

The first short detection terminal 210 of the board 200*q* in FIG. 16D has the longer extended portion than the first short detection terminal 210 of the board 200*i* and 200*p*. As shown in FIG. 16D, the extended portion of the first short detection terminal 210 of the board 200*q* extends from upper left through lower to upper right of the first sensor drive terminal 250 along the circumferential edge of the first sensor drive terminal 250. In other words, the first short detection terminal 210 is formed so as to surround the first sensor drive terminal 250 completely. As a result, the length of the first portion in the board 200*q* is longer than that in the board 200*i* and 200*p*. Accordingly, when the first sensor drive terminal 250 and terminal other than the first short detection terminal 210 are shorting, there is a higher possibility the sensor driving voltage is suspended and problems caused by shorting of the first sensor drive terminal 250 to another terminal can be prevented or reduced.

As shown in FIGS. 16A-C, board 200*i*, 200*p*, 200*q* are added the direction in which the portion of the first short detection terminal 210 is located adjacently to a portion of the sensor drive terminal 250 by providing the extended portion of the first short detection terminal 210. About board 200*i*, the extended portion of the first short detection terminal 210 located adjacently to left border of the first sensor drive terminal 250 in a lateral direction towards an edge of the ink cartridge 100, and the first short detection terminal 210 itself is located adjacently to upper border of the first sensor drive terminal 250 in opposite direction of the insertion direction R. Meanwhile, about board 200*p*, in addition to above-mentioned two directions, the extended portion of the first short detection terminal 210 is located adjacently to lower border of the first sensor drive terminal 250 in the insertion direction R. Furthermore, about board 200*q*, the extended portion of the first short detection terminal 210 is located adjacently to right border of the first sensor drive terminal 250 in lateral direction away from an edge of the ink cartridge 100. In other words, about board 200*q*, at least a portion of the first short detection terminal 210 is located adjacently to the first sensor drive terminal 250 in all direction.

When the first sensor drive terminal 250 and terminal other than the first short detection terminal 210 are shorting by ink drop or other object infiltrating from the direction in which the portion of the first short detection terminal 210 is located adjacently to the portion of the first sensor drive terminal 250, there is a much high possibility that the first sensor drive terminal 250 and the first short detection terminal 210 are shorting. Accordingly, problems caused by shorting of the first sensor drive terminal 250 to another terminal by ink drop or other object infiltrating from such direction can be prevented or reduced with much high probability. In the present variations, the extended portion of the first short detection terminal 210 adds the direction in which the first short detection terminal 210 and the first sensor drive terminal 250 are adjacent each other, and prevents or reduces problems caused by shorting of the first sensor drive terminal 250 to another terminal with much high probability.

In the boards 200*i*, 200*p*, 200*q* pertaining to this variation, only the first short detection terminal 210 on the left side is furnished with a structure having the extended portion described above, but it would be possible to furnish the second short detection terminal 240 on the right side with a structure having an extended portion, in addition to the first short detection terminal 210 or instead of the first short detection terminal 210. In this case as well, there are afforded advantages analogous to those of the boards 200*i*, 200*p*, 200*q* pertaining to this variation.

Variation 9:

The board 200*j* depicted in FIG. 16B, like the board 200*f* described previously in Variation 5, has an integral terminal 215 wherein the first short detection terminal 210 and the ground terminal 220 in the board 200 pertaining to the embodiment are integrally formed as a single member. The integral terminal 215 of the board 200*j* differs in shape from the integral terminal 215 of the board 200*f* described previously. Specifically, the integral terminal 215 of the board 200*j*, like the first short detection terminal 210 of the board 200*i* described in Variation 8, has a shape elongated on the left side, and has an extended portion reaching from the left edge portion to the vicinity of the lower edge of the lower row. In this case, advantages analogous to those of the board 200*i* pertaining to Variation 8 are attained, while reducing the number of production steps and parts needed for the board.

In the embodiment and variations described hereinabove, all of the terminals are situated on the board 200, but it is not necessary that all terminals be situated on the board 200. For example, it would be acceptable for some of the terminals to be situated on the housing 101 of the ink cartridge 100. By way of specific examples, Variation 10 and Variation 11 shall be described below with reference to FIGS. 17A-18D. FIGS. 17A-D show diagrams depicting the construction around boards of ink cartridges pertaining to variations. FIGS. 18A-D show cross sections A-A to D-D in FIG. 17.

Figure 17A:
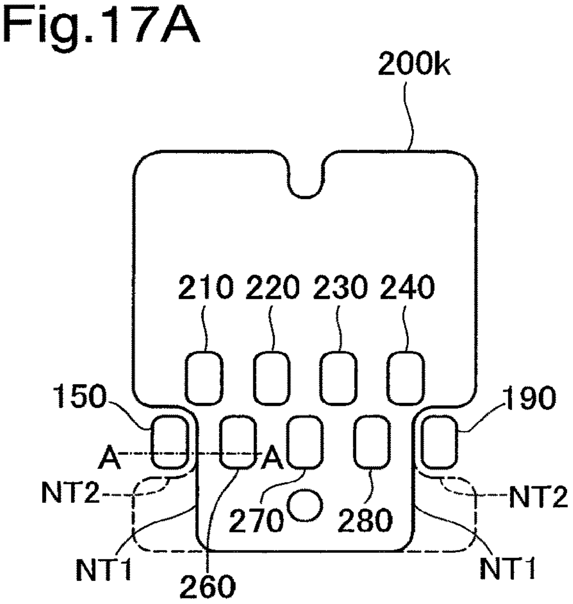
FIGS. 17A-D show diagrams depicting the construction around boards of ink cartridges pertaining to variations.

Variation 10:

The board 200*k* depicted in FIG. 17A is furnished with seven terminals 210-240 and 260-280, out of the nine terminals 210-290 furnished to the board 200 of the embodiment. Out of the nine terminals 210-290 furnished to the board 200 of the embodiment, the board 200*k* lacks the first sensor drive terminal 250 and the second sensor drive terminal 290. The board 200*k* pertaining to this variation is furnished with notches NT1 or NT2 situated in zones that include the locations where the first sensor drive terminal 250 and the second sensor drive terminal 290 were disposed on the board 200 pertaining to the embodiment. The notches may have the shape indicated by the solid lines NT1, or the shape indicated by the broken lines NT2, in FIG. 17A. Terminals 150 and 190 having function similar to the first sensor drive terminal 250 and the second sensor drive terminal 290 of the board 200 in the embodiment are arranged on the housing 101 situated to the rear of the board 200*k*. Naturally, with the ink cartridge 100 attached to the holder 4, these terminals 150 and 190 are situated at locations contacting the corresponding apparatus-side terminals 450 and 490.

Figure 18A:
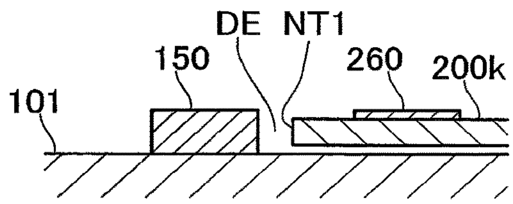
FIGS. 18A-D show cross sections A-A to D-D in FIG. 17.

A-A cross section viewed in FIG. 17A is depicted in FIG. 18A. As shown in FIG. 18A, a depressed portion DE, formed by a gap between the notch NT1 of the board 200*k* and the terminal 150, is situated between the terminal 150 and the adjacent terminals 260, 210 (in FIG. 18A, the reset terminal 260 is shown). While omitted from the drawing, a similar depressed portion DE is situated between the terminal 190 and the adjacent terminals 280, 240.

According to this variation, the following advantages are afforded in addition to those analogous to the board 200 pertaining to the embodiment. If an ink drop or foreign matter should infiltrate from the end of the ink cartridge 100 pertaining to this variation, it will become trapped in the depressed portion DE arranged surrounding the terminal 150 or the terminal 190, whereby shorting of the terminal 150 or the terminal 190 to another terminal due to an infiltrating ink drop or foreign matter can be further prevented or minimized.

Variation 11

Figure 17B:
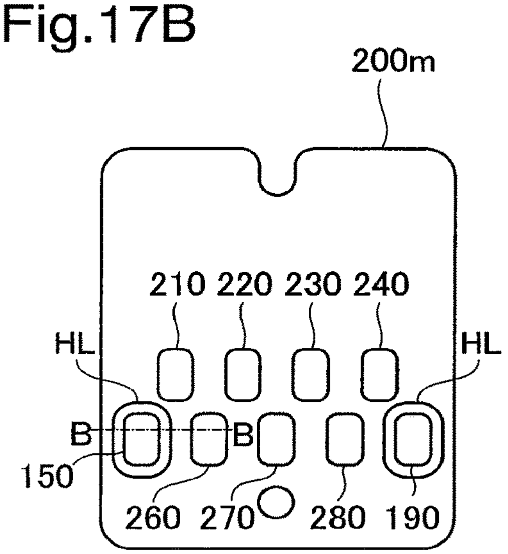
Figure 18B:
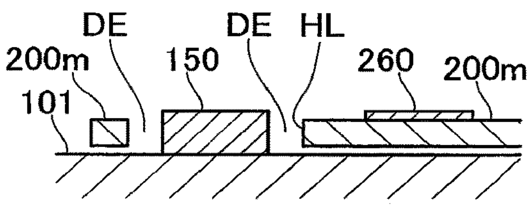

The board 200*m* depicted in FIG. 17B, rather than having the notches NT1 or NT2 pertaining to Variation 10, is instead furnished with through-holes HL situated at locations corresponding to the locations where the first sensor drive terminal 250 and the second sensor drive terminal 290 are situated on the board 200 pertaining to the embodiment. B-B cross section viewed in FIG. 17B is depicted in FIG. 18B. Other arrangements of the ink cartridge 100 pertaining to Variation 11 are the same as those of the ink cartridge 100 pertaining to Variation 10. In this variation as well, depressed portions DE are situated between the terminals 150, 190 and the adjacent terminals. Accordingly, the ink cartridge 100 pertaining to this variation affords advantages analogous to those of the ink cartridge 100 pertaining to Variation 10.

Variation 12:

In the boards pertaining to the embodiment and variations, all terminals are connected to one of memory 203 and sensor 104. However, the board may include dummy terminal that is not connected to any device. An example of such type of the board will be described as Variation 12 with reference to FIGS. 19A-D. FIGS. 19A-D show fourth diagrams depicting boards pertaining to variations.

The board 200*r* includes the upper row formed by four terminals and the lower row formed by five terminals, as with the board 200 pertaining to the embodiment. Arrangement and function of the terminals 210-290 forming the upper row and the lower row of board 200*r* is the same as those of the terminals of board 200 in the embodiment, so the detailed description thereof is omitted.

Figure 19A:
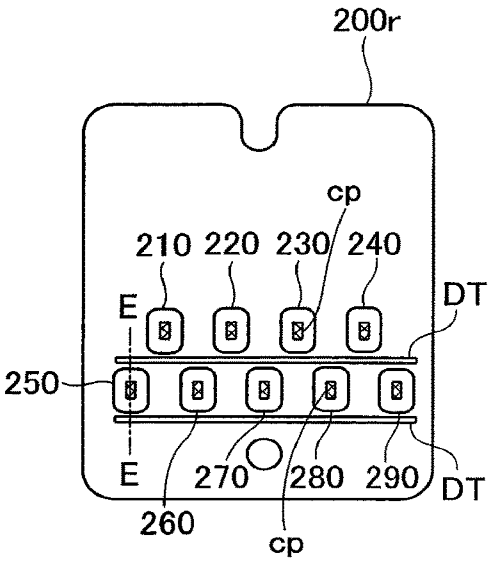
FIGS. 19A-D show fourth diagrams depicting boards pertaining to variations.
Figure 19B:
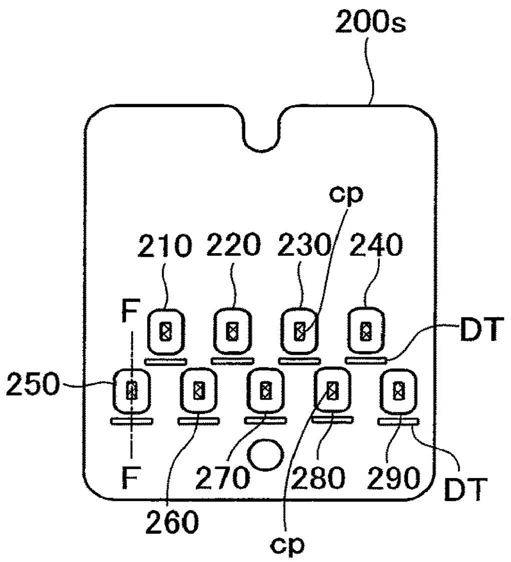
Figure 19C:
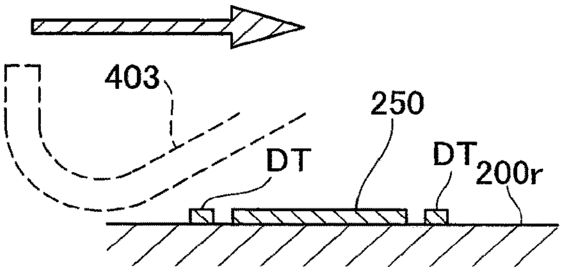
Figure 19D:
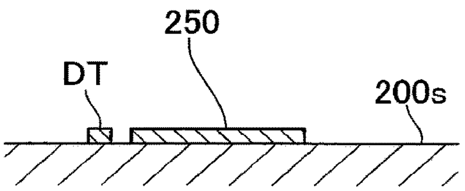

The board 200*r* shown in FIG. 19A has the dummy terminals DT between the upper row and the lower row and on the underside (the insertion direction side) of the lower row. The dummy terminals DT, for example, are made of the same material as other terminal 210-290. FIG. 19C shows E-E cross-section including dummy terminals DT. The dummy terminals DT has about the same thickness as other terminal 210-290.

The dummy terminals DT are for scraping away foreign object adherent on the contact forming members 403, for example, dust when ink cartridge 100 is attached or detached. This enables to prevent foreign object from being brought to the terminal to be contacted by contact forming member 403 (for example, the first sensor drive terminal 250 in FIG. 19C) when ink cartridge 100 is attached or detached, and to prevent contact failure between the terminal and the contact forming member 403.

The board 200*r* shown in FIG. 19A has the dummy terminal DT between the first sensor drive terminal 250 and the short detection terminal 210, so you can't say first sensor drive terminal 250 is located adjacent to first short detection terminal 210. However, the dummy terminals DT is not connected to memory 203 and not connected to the apparatus-side terminals 510-590 on printing apparatus 1000. Therefore, the shorting between the first sensor drive terminal 250 and the dummy terminals DT never cause any problem. Accordingly, the board 200*r* can afford working effects analogous to the board 200 pertaining to the embodiment. That is to say, about the board 200*r*, even if first sensor drive terminal 250 is not located adjacent to first short detection terminal 210 in a precise sense, at least a portion of the first short detection terminal 210 is arranged relative to at least a portion of the first sensor drive terminal 250, without a terminal connected to memory 203 (terminal 220, 230, 260-280) therebetween in at least one direction, for the detection of shorting between the first sensor drive terminal 250 and the first short detection terminal 210. In such a case, the first sensor drive terminal 250 is substantially located adjacent to first short detection terminal 210. Consequently, in the event that the first sensor drive terminal 250 should short to another terminal or terminals due to the ink drop or the water drop, there is a high likelihood that the first sensor drive terminal 250 will short to the short detection terminal 210 as well. As a result, the output of sensor driving voltage is suspend and damage to the circuits of the memory 203 and the printing apparatus 1000 caused by shorting can be prevented or reduced.

Figure 20:
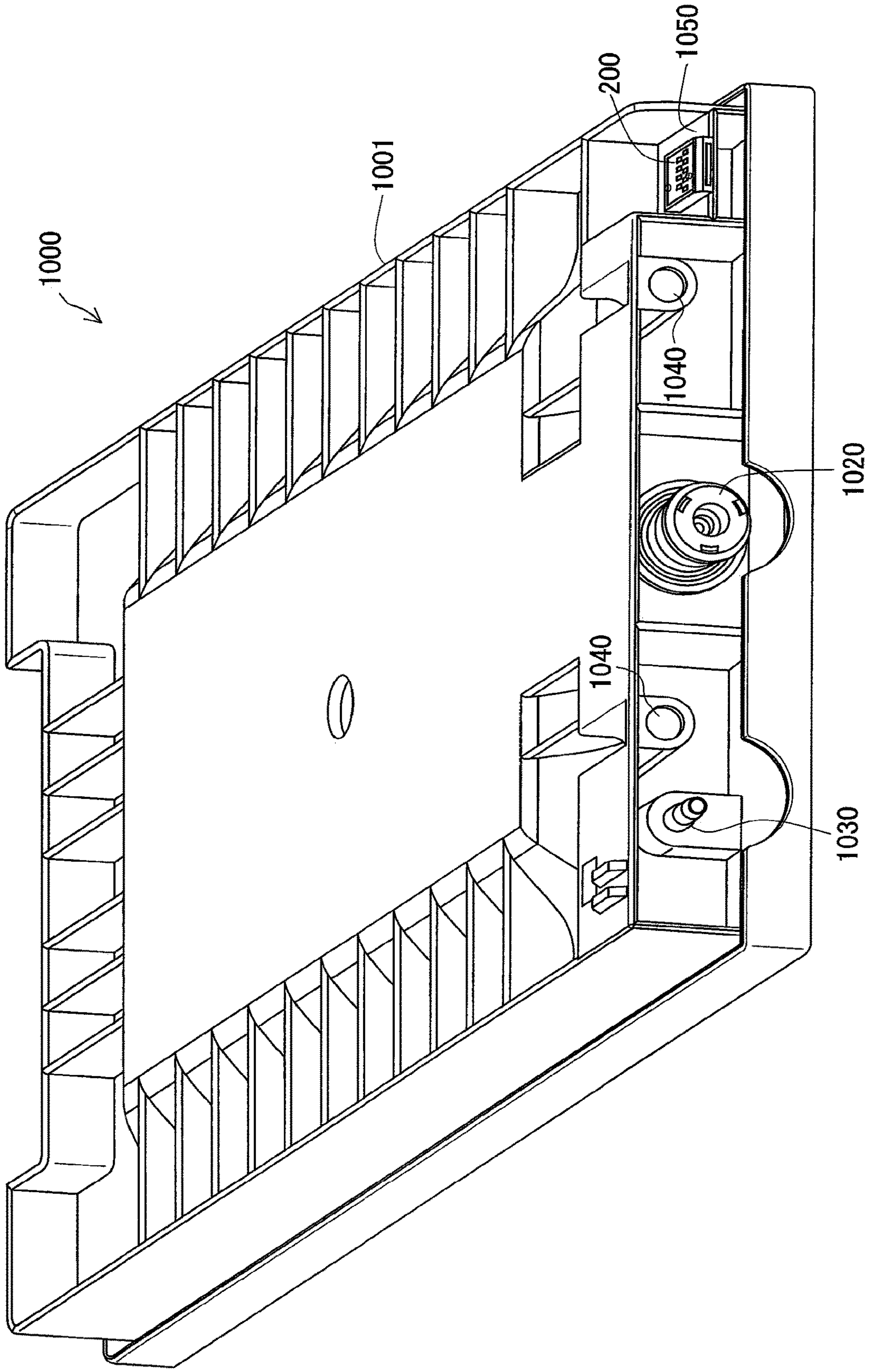
FIG. 20 shows a perspective view of the construction of the ink cartridge pertaining to a variation.
Figure 21:
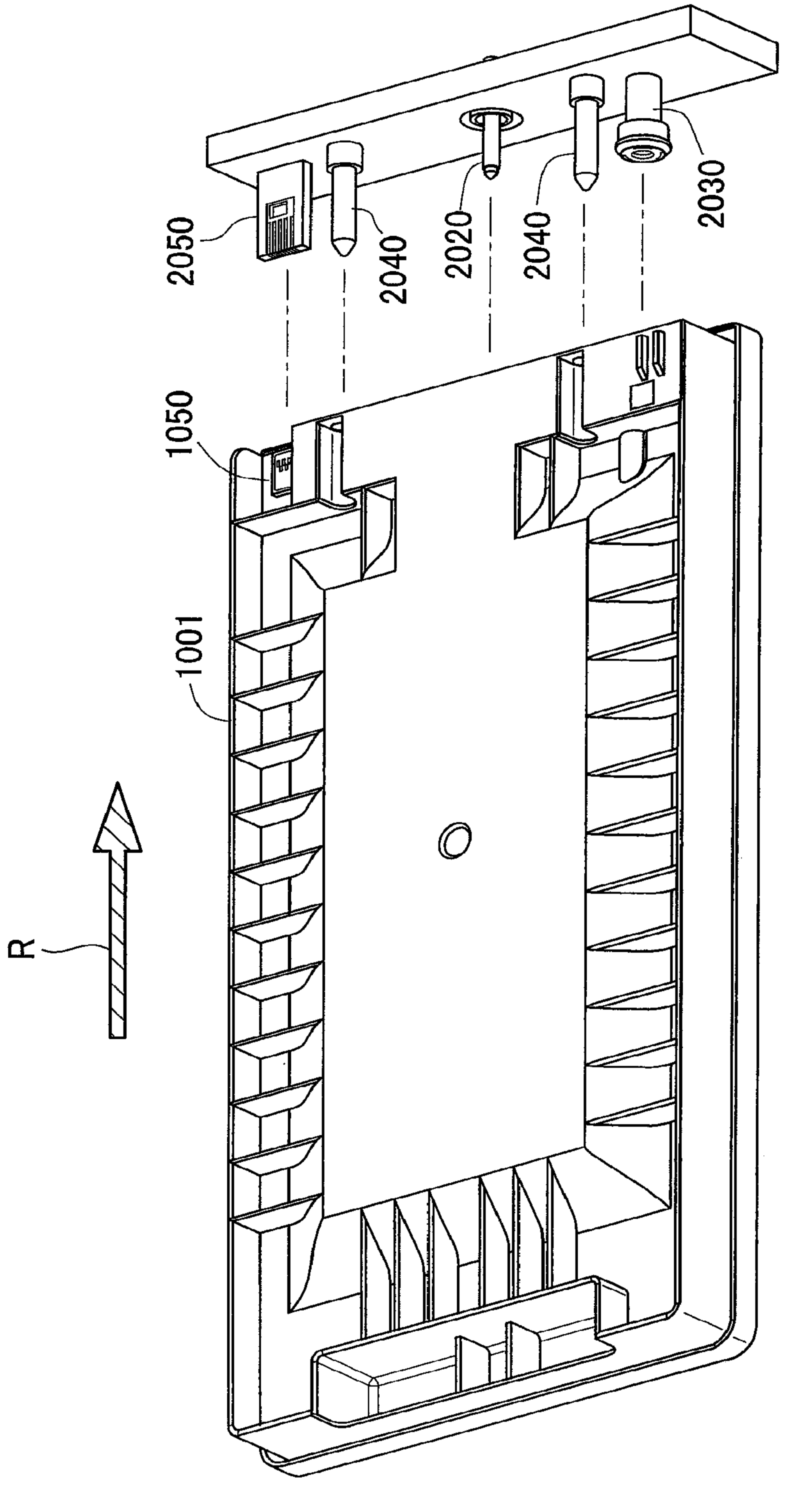
FIG. 21 shows a picture of the ink cartridge pertaining to a variation being attached to the printer.

Variation 13:

The boards pertaining to the embodiment and variations, as shown in FIG. 2, are described as the board mounted on a ink cartridge 100 used for "on carriage" type printer. However, the boards pertaining to the embodiment and variations may be mounted on an ink cartridge used for "off carriage" type printer. The ink cartridge used for "off carriage" type printer will be described below with reference to FIG. 20 and FIG. 21. FIG. 20 shows a perspective view of the construction of the ink cartridge pertaining to the variation 13. FIG. 21 shows a picture of the ink cartridge pertaining to the variation 13 being attached to the printer.

Ink cartridge 100*b* pertaining to Variation 13 is configured for installation in an "off carriage" type printer, i.e., one in which the ink cartridge is not installed on a carriage. Off carriage type printers are typically large-scale printers; the ink cartridges employed in such large-scale printers are typically larger in size than the ink cartridges employed in on-carriage type printers.

Ink cartridge 100*b* comprises a housing 1001 containing ink, a board mounting portion 1050 for mounting board 200, an ink feed orifice 1020 for supplying ink from a housing 1001 to the printer; an air feed orifice 1030 allowing intake of air into ink cartridge 100*b* to allow smooth flow of ink; and guide portions 1040 for installation in the printer. The exterior dimensions of ink cartridge 100*b* are such that the side thereof (i.e. the depth direction) extending perpendicular to the side on which the guide portions 1040, etc. are formed (i.e. the width direction) is longer than the width direction. The relationship of the depth-wise dimension to the width-wise dimension of board 200, expressed as a ratio of the two, is 15:1 or greater, for example.

As in the case of the above-mentioned embodiment, board 200 is positioned by means of boss hole 202 and boss slot 201, and secured on the board mounting portion 1050 of ink cartridge 100*b*.

As shown in FIG. 21, when installing the ink cartridge 100*b* in the printer, the guide portions 1040 of ink cartridge 100*b* guide the guide pins 2040 on the printer so that the board mounting portion 1050, ink feed orifice 1020, and air feed orifice 1030 are appropriately contacted/coupled with a contact pin 2050, ink feed orifice 2020, and air feed orifice 2030 on the printer. The insertion direction of ink cartridge 100*b* is indicated by arrow R in FIG. 21. The insertion direction R on board 200 in this variation is the same as that in the above-mentioned embodiment.

Ink cartridge 100*b* used for off carriage type printer pertaining to this variation can prevent or reduce problems caused by shorting of the first sensor drive terminal 250 to another terminal as in the case of the embodiment and variations described above.

Figure 22:
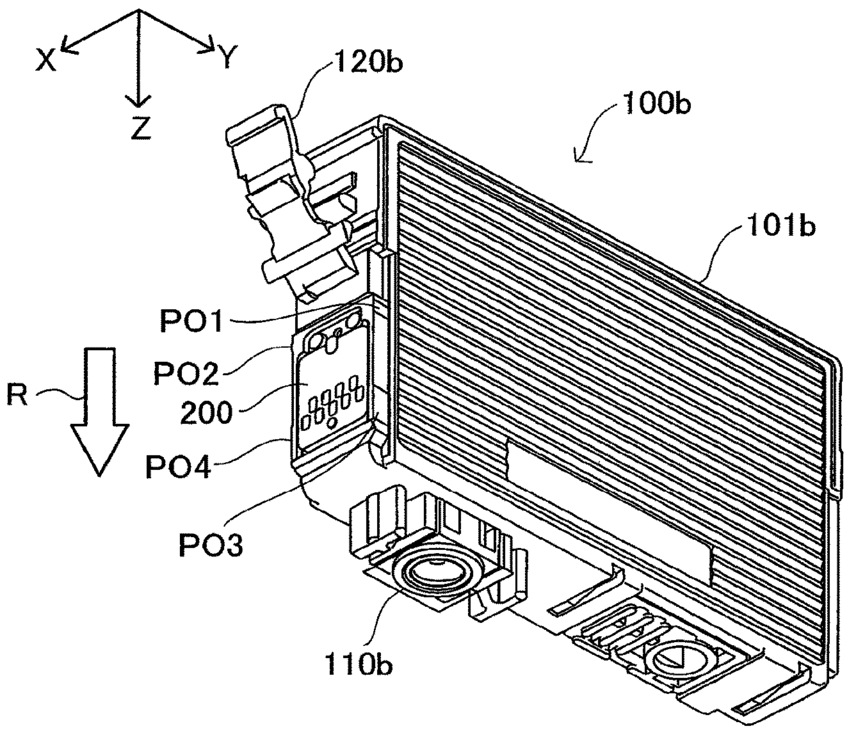
FIG. 22 shows a first diagram of the construction of the ink cartridge pertaining to a variation.
Figure 23:
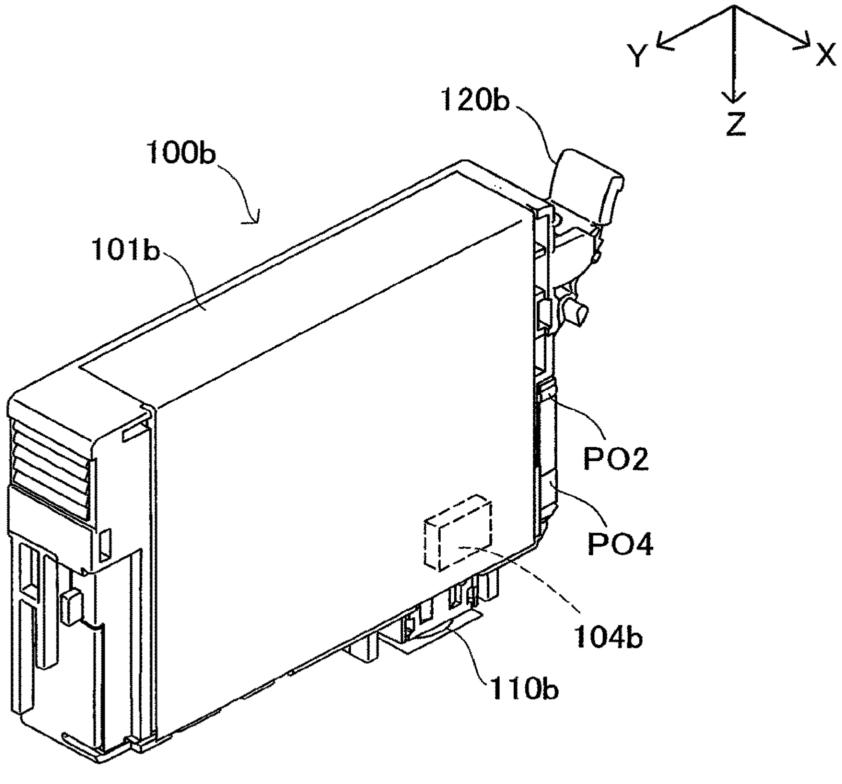
FIG. 23 shows a second diagram of the construction of the ink cartridge pertaining to a variation.
Figure 24:
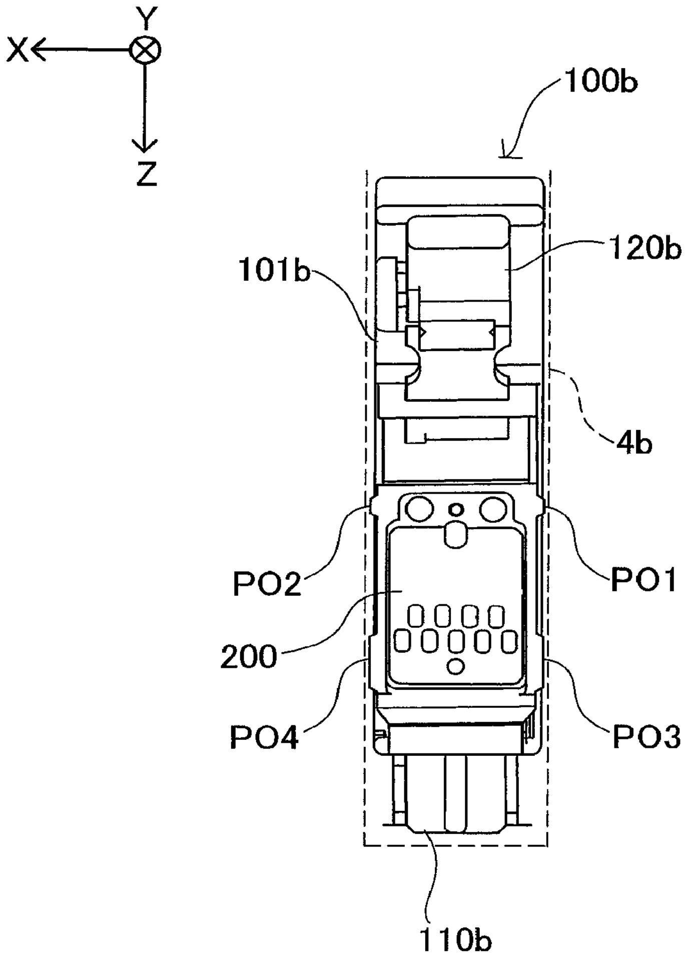
FIG. 24 shows a third diagram of the construction of the ink cartridge pertaining to a variation.

Variation 14:

Configuration of the ink cartridge for "on carriage" type printer shown in FIG. 2 is one example among many. Configuration of the ink cartridge for "on carriage" type printer is not limited to this. Other configuration of the ink cartridge for "on carriage" type printer shall be described as Variation 14 with reference to FIGS. 22-24. FIG. 22 shows a first diagram of the construction of the ink cartridge pertaining to Variation 14. FIG. 23 shows a second diagram of the construction of the ink cartridge pertaining to variation 14. FIG. 24 shows a third diagram of the construction of the ink cartridge pertaining to Variation 14.

As shown in FIGS. 22 and 23, the ink cartridge 100*b* pertaining to Variation 14 includes housing 101*b*, board 200 and sensor 104*b*. On the bottom face of the housing 101*b*, as with ink cartridge 100 in the embodiment, there is formed an ink supply orifice 110*b* into which the ink supply needle inserts when ink cartridge 100*b* is attached to the holder 4*b*. The board 200 is mounted on the lower side (Z-axis plus direction side) of the front face (Y-axis plus direction side face) of the housing 101 as with ink cartridge 100 in the embodiment. Configuration of the board 200 is identical with the board 200 in the embodiment. The sensor 104*b* is embedded in the side wall of the housing 101*b* and used for detection of remaining ink level. Hook 120*b* that engages with catching part of the holder 4*b* when the ink cartridge 100*b* is attached to the holder 4*b* is mounted on the upper side of the front face of the housing 101*b*. Hook 120*b* fixates the Ink cartridge 100*b* to the holder 4*b*. The insertion direction when the ink cartridge 100*b* is attached to the holder 4*b* is a direction of arrow R in FIG. 22 (Z-axis plus direction) as with the ink cartridge 100 in the embodiment.

The housing 101*b* has displacement preventers PO1-PO4 on the side portion (x-axis direction side) of housing 101*b* close to the board 200. The displacement preventers PO1-PO4 comes into contact with or close to a corresponding portion of the side wall of the holder 4*b* when the ink cartridge 100*b* is attached to the holder 4*b*. This prevents the ink cartridge 100*b* from moving in X-axial direction from its ideal position on the holder 4*b*. Specifically, the displacement preventers PO1 and PO2 are located on the upper side of the board 200 and prevent the upper side of the 100*b* from swinging in X-axial direction taking the ink supply orifice 110*b* as an axis of rotation. The displacement preventers PO3 and PO4 are lateral to the terminals 210-290 on the board 200 (FIG. 3) and keep the terminals 210-290 in the correct position so as to contact the corresponding apparatus-side terminal 410-490 correctly.

The electrical arrangements of the ink cartridge 100*b* pertaining to Variation 14 is identical with those of the ink cartridge 100 pertaining to above-embodiment described with reference to FIG. 7. So, the description thereof is omitted.

The ink cartridge 100*b* pertaining to Variation 14 affords the following working effects in addition to the same working effects as the ink cartridge 100 pertaining to the embodiment. Since the ink cartridge 100*b* has the displacement preventers PO1-PO4, it can prevent or reduce the position displacement when the ink cartridge 100*b* is attached to the holder 4*b*. Especially, since the displacement preventers PO3 and PO4 are lateral to the terminals 210-290 on the board 200, accuracy of positioning of the terminals 210-290 relative to the corresponding apparatus-side terminals can be improved. Further, as described with reference to FIG. 3, in the board 200, the sensor drive terminal 250 and the second sensor drive terminal 290 are arranged at each end of the terminals 210-290, that is, the sensor drive terminal 250 and the second sensor drive terminal 290 are closest to the displacement preventers PO4 and PO4 respectively. This lead to improvement of accuracy of positioning of the sensor drive terminal 250 and the second sensor drive terminal 290. Therefore, the false contact between the terminals 250, 290 to which high voltage is applied and one of the non-corresponding apparatus-side terminals can be prevented or reduced.

As substitute for the board 200 in the embodiment, one of the boards 200*b*-200*s* shown in FIGS. 14-19 can be mounted on the ink cartridge 100*b* shown in FIG. 22-24.

Figure 17C:
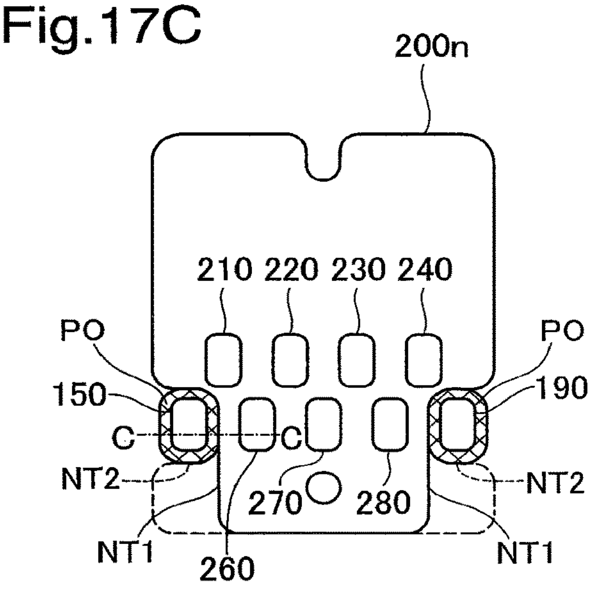
Figure 17D:
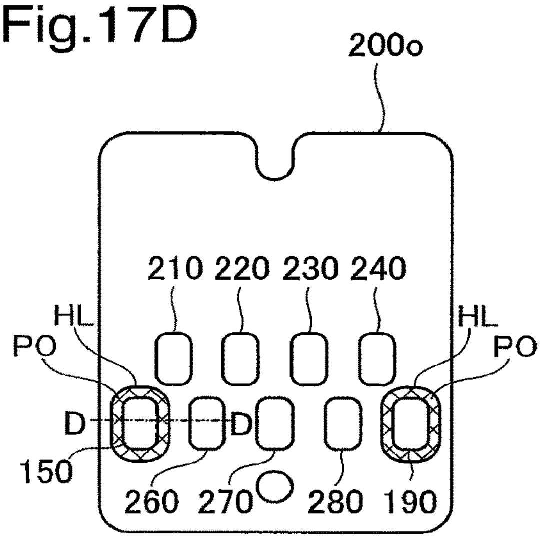
Figure 18C:
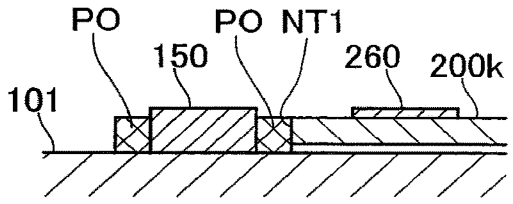
Figure 18D:
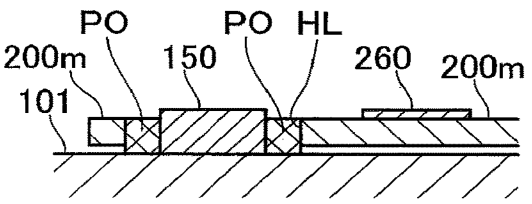

Other Variations:

As depicted in FIGS. 17C-D and in FIGS. 18C-D, porous elements PO may be disposed within the depressed portions DE in Variation 10 and Variation 11 described above, i.e. between the terminals 150, 190 and the board. By so doing, ink drops or condensed water, which can easily cause shorting of the terminals 150, 190 to other terminals, can be effectively absorbed by the porous elements PO. Accordingly, this design also affords advantages analogous to those of Variation 10 and Variation 11 discussed above.

In the embodiment herein, the ink cartridge 100 is furnished with a sensor 104 (piezoelectric element) and memory 203 as the plurality of the devices; however, the plurality of the devices are not limited to a sensor 104 and memory 203. For example, the sensor 104 may be a sensor of a type that detects the properties or level of ink by means of applying voltage to the ink within an ink cartridge 100, and measuring its resistance. In the embodiment, among the plurality of the devices, the sensor 104 is mounted on the housing 101 and the memory 203 is mounted on the board 200. However, the arrangements of the plurality of the devices are not limited to those in the embodiment. For example, the memory 203 and the board 200 may be separate, and the memory 203 and the board 200 may be installed on the housing 101 individually. The plurality of the devices may be integrated into a circuit board or a single module. The circuit board or the single module may be mounted on the housing 101 or the board 200. It's preferred that terminals connected to a device to which relatively high voltage among the plurality of the devices are arranged in positions of the first sensor drive terminal 250 and the second sensor drive terminal 290 described above, and terminals connected to a device to which relatively low voltage among the plurality of the devices are arranged in positions of the terminals 220, 230, 260-280. In this case, damage to the ink cartridge 100 and the printing apparatus 1000 caused by shorting between the terminal connected to the device to which relatively high voltage and the terminal connected to the device to which relatively low voltage can be prevented or reduced.

In above-mentioned embodiment, five terminals for memory 203 (220, 230, 260-280) and two terminals for sensor 104 (250, 290) are employed, however, other number of terminals may be employed due to the specification of the device. For example, the terminal connected to the device to which relatively high voltage may be one. In this case, such terminal may be arranged in a position of any of the terminals 250, 290 described above.

Whereas in the embodiment herein the invention is implemented in an ink cartridge 100, implementation thereof is not limited to ink cartridges, with implementation in a similar manner to receptacles containing other types of printing material, such as toner, being possible as well.

With regard to the arrangements of the main control circuit 40 and the carriage circuit 500 in the printing apparatus, portions of these arrangements implemented through hardware could instead be implemented through software, and conversely portions implemented through software could instead be implemented through hardware.

While the printing material container and board pertaining to the invention have been shown and described on the basis of the embodiment and variation, the embodiments of the invention described herein are merely intended to facilitate understanding of the invention, and implies no limitation thereof. Various modifications and improvements of the invention are possible without departing from the spirit and scope thereof as recited in the appended claims, and these will naturally be included as equivalents in the invention.

What is claimed is:

1. A printing material container detachably attachable to a printing apparatus having a plurality of apparatus-side terminals, the printing material container comprising:

a first device, which is a memory;

a second device; and a terminal group that includes a plurality of first terminals, a plurality of second terminals and a plurality of third terminals, wherein:

the plurality of first terminals are connected to the first device and respectively include a first contact portion for contacting a corresponding terminal among the plurality of apparatus-side terminals, the plurality of first terminals are connected to the memory and comprise a ground terminal, a power supply terminal, a reset terminal, a clock terminal, and a data terminal, the plurality of second terminals are connected to the second device and respectively include a second contact portion for contacting a corresponding terminal among the plurality of apparatus-side terminals, the plurality of second terminals are arranged to have a higher voltage externally applied thereto than a voltage applied to the plurality of first terminals, the plurality of third terminals are for detection of shorting between at least one second terminal and at least one third terminal and respectively includes a third contact portion for contacting a corresponding terminal among the plurality of apparatus-side terminals, the first contact portions, the second contact portions, and the third contact portions are arranged so as to form multiple rows, the second contact portions are arranged at an outermost position among the contact portions of the terminal group viewed in a direction orthogonal to an insertion direction, and the first contact portions, the second contact portions, and the third contact portions are arranged in the following order along the direction orthogonal to the insertion direction: one second contact portion, one third contact portion, the first contact portions, another third contact portion, and another second contact portion.

2. The printing material container according to claim 1, wherein the second contact portions are arranged at each end of one row among the multiple rows.

3. The printing material container according to claim 1, wherein the third contact portions are arranged at each end of one row among the multiple rows.

4. The printing material container according to claim 1, wherein the first contact portions, the second contact portions and the third contact portions are arranged in a staggered arrangement.

5. The printing material container according to claim 1, wherein the second device is operated by a higher voltage than the first device.

* * * * *